United States Patent
Joshi et al.

(10) Patent No.: US 11,836,508 B2
(45) Date of Patent: Dec. 5, 2023

(54) CONTEXTUAL MANAGEMENT OF BROWSER EXTENSIONS

(71) Applicant: McAfee, LLC, San Jose, CA (US)

(72) Inventors: Harsha Ramamurthy Joshi, Bangalore (IN); Saravana Kumar Ramalingam, Bangalore (IN); Jitesh Dattani, Bangalore (IN); VijayaSumanth Pinapala, Bengaluru (IN); Sohan Lal, Bengalluru (IN); Dattatraya Kulkarni, Bangalore (IN); Siddartha Y. Ramamohan, Bengaluru (IN); Srikanth Nalluri, Karnataka (IN)

(73) Assignee: McAee, LLC, San Jose, CA (US)

( * ) Notice: Subject to any disclaimer, the term of this patent is extended or adjusted under 35 U.S.C. 154(b) by 405 days.

(21) Appl. No.: 17/146,782

(22) Filed: Jan. 12, 2021

(65) Prior Publication Data

US 2022/0222089 A1    Jul. 14, 2022

(51) Int. Cl.
| | |
|---|---|
| *G06F 9/445* | (2018.01) |
| *G06F 16/955* | (2019.01) |
| *H04L 9/40* | (2022.01) |
| *G06F 9/54* | (2006.01) |
| *G06F 16/953* | (2019.01) |
| *G06F 16/954* | (2019.01) |

(52) U.S. Cl.
CPC .......... *G06F 9/44526* (2013.01); *G06F 9/547* (2013.01); *G06F 16/953* (2019.01); *G06F 16/954* (2019.01); *G06F 16/9566* (2019.01); *H04L 63/20* (2013.01)

(58) Field of Classification Search
None
See application file for complete search history.

(56) References Cited

U.S. PATENT DOCUMENTS

| | | | | |
|---|---|---|---|---|
| 8,181,254 | B1* | 5/2012 | Kay | G06F 21/51 |
| | | | | 713/168 |
| 8,200,962 | B1* | 6/2012 | Boodman | G06F 16/958 |
| | | | | 713/176 |
| 8,386,604 | B1* | 2/2013 | Kay | G06F 11/3495 |
| | | | | 709/224 |
| 8,935,755 | B1* | 1/2015 | Kay | G06F 9/44526 |
| | | | | 726/4 |
| 2005/0229104 | A1* | 10/2005 | Franco | G06F 9/44526 |
| | | | | 715/749 |
| 2012/0192275 | A1* | 7/2012 | Oliver | G06F 21/51 |
| | | | | 726/24 |
| 2015/0007330 | A1* | 1/2015 | Gomez | G06F 21/577 |
| | | | | 726/25 |
| 2015/0326486 | A1* | 11/2015 | Zawadowskiy | H04L 12/6418 |
| | | | | 709/224 |
| 2016/0357583 | A1* | 12/2016 | Decker | G06F 8/62 |
| 2019/0281059 | A1* | 9/2019 | Chittampally | G06F 16/953 |
| 2020/0250316 | A1* | 8/2020 | Rickerd | G06F 9/44526 |

(Continued)

*Primary Examiner* — Kaveh Abrishamkar
(74) *Attorney, Agent, or Firm* — Patent Capital Group

(57) ABSTRACT

There is disclosed in one example a computing endpoint, including: a hardware platform including a processor and a memory; an operating system to run on the hardware platform; a web browser to run on the operating system, and including an extension framework; and a management extension to run in the extension framework, and to contextually manage availability of other extensions according to a URL reputation and extension reputation.

20 Claims, 17 Drawing Sheets

(56) References Cited

U.S. PATENT DOCUMENTS

| | | | |
|---|---|---|---|
| 2022/0215095 A1* | 7/2022 | Varanda | G06F 21/54 |
| 2022/0222089 A1* | 7/2022 | Joshi | G06F 9/547 |
| 2022/0232038 A1* | 7/2022 | Kulkarni | G06F 16/116 |
| 2022/0382823 A1* | 12/2022 | Naito | G06F 16/90332 |

\* cited by examiner

CONTEXTUAL MANAGEMENT OF BROWSER EXTENSIONS

FIELD OF THE SPECIFICATION

This application relates in general to computer security, and more particularly, though not exclusively, to a system and method of providing contextual management of browser extensions.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
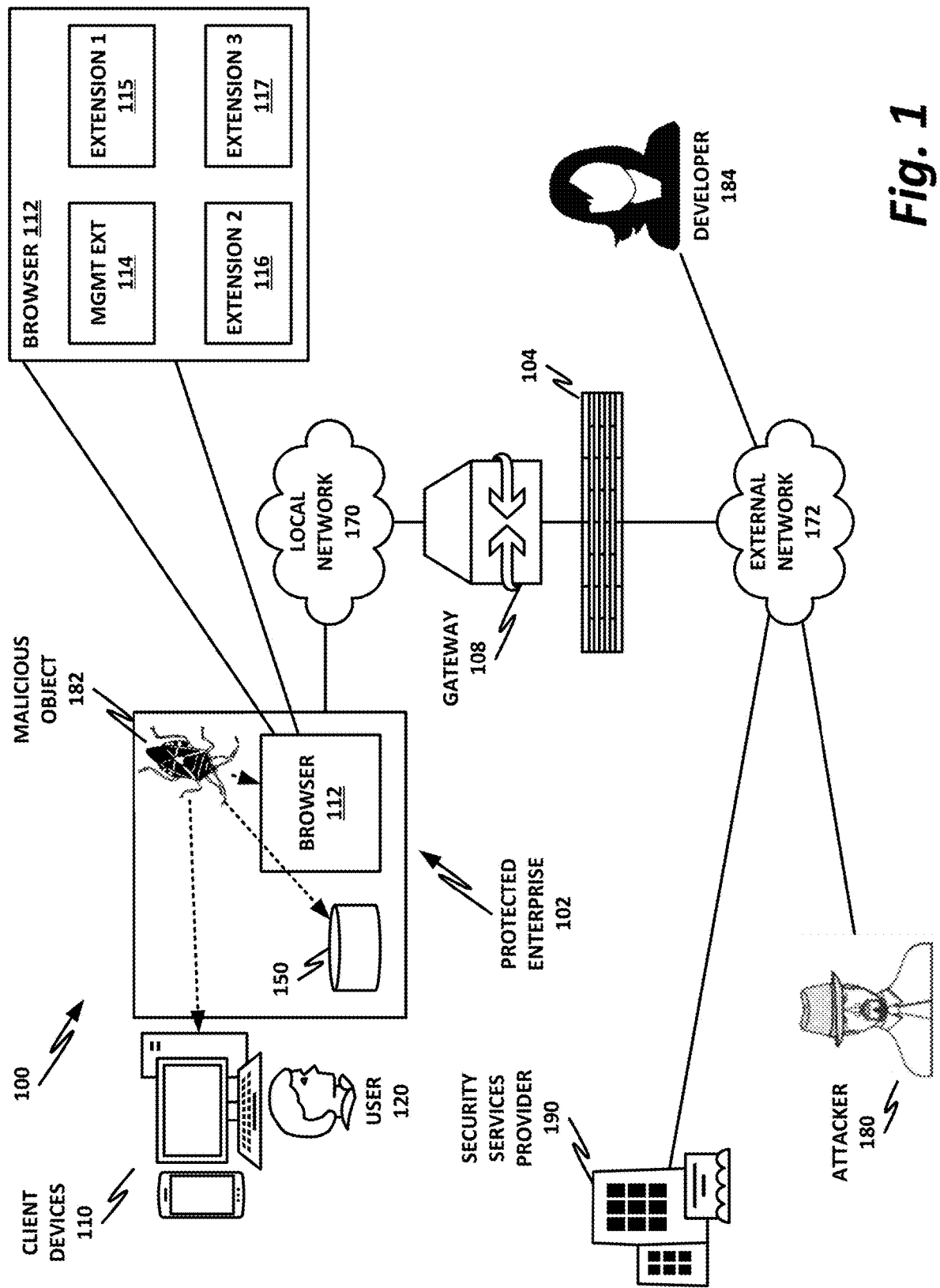
FIG. 1 is a block diagram of selected elements of a security ecosystem.

In an example, there is disclosed a computing endpoint, comprising: a hardware platform comprising a processor and a memory; an operating system to run on the hardware platform; a web browser to run on the operating system, and including an extension framework; and a management extension to run in the extension framework, and to contextually manage availability of other extensions according to a uniform resource locator (URL) reputation and extension reputation.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In contemporary computing systems, the web browser has become increasingly important. In particular, with the heavy usage of web-based applications and software as a service (SAAS), the browser has become for many users essentially a second-tier operating system. Indeed, for some systems such as Google Chromebook, the browser may be considered the primary operating system. Thus, for many modern users, the web browser is the single point of entry to most of the electronic world.

In contemporary usage, many applications on personal computer (PC), mobile, tablet, smart TVs, and other platforms allow users to connect from anywhere on the Internet. This allows the user to see text, images, video, and other data from anywhere in the world. Almost any activity that a user wishes to do can be done on a web browser. This can include playing games, watching videos, listening to music, online banking, online productivity, e-mail, collaboration, chatting, and others.

With the browser acting as a parallel or second-tier operating system, users have also found it desirable to add extensions or add-ons to their browsers. Most major web browsers let users modify their experience through extensions or add-ons. For example, Microsoft has recently rolled out the Edge web browser, based on Chromium. This means that Microsoft Edge is now compatible with all Chrome extensions.

Chromium-based browsers, Firefox, and Safari together constitute almost the entire market share of browsers in current usage. His. All three of these provide extensions or add-ons. These extensions can do many useful things, which may be fun for the user, and/or practical. For example, they can enable new features, block ads, help with grammar, provide foreign language dictionaries, change the visual appearance, store passwords, store credit cards, and similar.

Currently, the Chrome Web Store for Chromium-based browsers hosts more than 188,000 extensions across 12 categories, with a total installation count of at least 2.4 billion. Firefox and Safari have add-on or extension stores at similar orders of magnitude.

These extensions are generally developed by independent developers and third-party companies. Therefore, the user may not be able to absolutely trust an extension. While the browser vendors themselves do some curating and gatekeeping of their extension stores, much of this curation and gatekeeping is to ensure that the browser does not inhibit the functionality of the extension, and is less concerned with the operation of the extension itself. The browser vendors have essentially left it as an exercise for the user to determine which permissions an extension is using, whether those permissions are acceptable, and whether the user trusts the extension with those permissions.

Although extensions provide great utility for users, there are some aspects that make them attractive to hackers. For example, extensions have access to powerful functionality within the context of a browser. An extension can read sensitive user inputs and data, such as username, password, social security number, bank account number, credit card details, and other personally identifiable information (PII). It can also alter browser settings, add user interface items, or even replace website content. Even when a user is browsing in "incognito" or "private" mode, data exfiltration can still occur from extensions. This is because extension developers can take permissions while running in incognito mode, and the user may have to specifically request that certain extensions not run in incognito mode.

Furthermore, many extensions are developed by novice developers that use out-of-date, third-party libraries that have known security vulnerabilities. Thus, even if the developer himself or herself is not malicious, the extension may still have security vulnerabilities. Currently, for example, approximately 32% of extensions use libraries that have known security vulnerabilities, while approximately 84% of extensions have no privacy policy and approximately 77% have no support site.

Furthermore, the extension permission model has issues of user understandability, transparency, and negligence. Most basic extensions take—by default—high and critical permissions. For example, at least 15% of extensions could read data on any site, and 9% could read cookies.

Thus, an extension's powerful capabilities can be exploited by bad actors, and can therefore pose threats, including exposure of PII, sensitive financial information, and other data. This could expose user behavior and lead to loss of privacy and financial damage, as well as exposure of the user to phishing and cryptojacking, targeted advertisements, and unsolicited surveillance.

This does not mean that all extensions are per se bad. Rather, extensions have security vulnerabilities inherent to their model that users may not be aware of. By way of example, extensions may be categorized into at least three types:

Born to be bad: Malicious browser extensions that deliberately perform malicious action, or that deliberately collect user information without notification.

Hijacking and buying extensions: These can hijack the user's processor for cryptojacking, or can drive up prices when the extension observes, for example, that the user is searching for flights to a particular destination.

Rogue web applications: These use vulnerable extensions for access to private user data.

Thus, while browser extensions may enhance the productivity and experience of users, they are often misused by hackers to spread malware, adware, and cryptojacking, and may be used to steal user PII, including credentials. As discussed above, browser vendors have not been successful in preventing bad extensions from entering their extension stores, and this has caused issues for user security and privacy.

Thus, absent the security mechanisms disclosed in the present specification, a user may have malicious extensions installed on his browser, and be at risk of exposing PII, credentials, and other data to bad actors. These malicious or negligent extensions may evade the protection and security parameters provided by current antivirus software tools, because they do not run, for example, as portable executables, or in an otherwise easily identifiable format.

The present specification discloses a system and method for hardening a browser's security posture by contextually managing the browser extensions installed in the browser environment. When a user navigates to a website, depending on the reputation and category of the domain itself, the reputation scores of the installed extensions, and user preferences, certain extensions may be enabled or disabled on a per-site basis. The reputation score of the installed extension may include categories such as security, privacy, and utility. For example, an ad blocker extension may have a high security and utility score, and may provide benefits to the user. However, when the user is visiting her banking website, it is unlikely that she needs an ad blocker. Thus, the ad blocker fails on the contextual utility of the banking website. In this case, the ad blocker may be disabled on the banking website. Not only does this prevent accidental or unexpected data leakage as the user visits the banking website, but it can also speed up browsing by disabling extensions that are not contextually useful for the website that the user is visiting.

In this example, the user navigates to a banking website, and a browser extension that provides a security agent queries a global uniform resource locator (URL) reputation database, such as MCAFEE, LLC's Global Threat Intelligence (GTI™), or similar. This returns a reputation for the URL, as well as a context or category for the URL. In this case, the category or context is financial transactions. While the user is on this website, selected extensions such as an ad blocker, e-mail productivity extensions (such as Grammerly), and other extensions that are not contextually useful on the banking website may be disabled. In this case, there is little to no utility for these extensions on the banking domain. However, another extension, such as a password keeper, may be useful on the banking website and is therefore enabled. By disabling extensions that have low security scores or that are contextually not useful on a particular website, there is a reduced risk of exposing banking credentials to an extension that has access to the domain.

The teaching and methods of the present specification provide contextual management of extensions on a user's browser environment by analyzing the category or reputation of a visited domain, and the risk posture of the installed extensions. It also analyzes the relevance of the extensions to the visited domain. This method increases the privacy and security of a user for a given extension. Advantageously, the privacy and security score of an extension may depend on the context. Thus, rather than providing merely a monolithic privacy and security score, the privacy and security score is sensitive to the browsing context.

On the backend, a cloud service may be provided that periodically crawls extension or add-on stores. The backend cloud service can then maintain a database of known extensions, and their privacy and security contexts for certain categories of websites. The backend service can also perform deeper analysis on newly discovered extensions, such as static analysis and/or dynamic analysis. It can also check for the presence of known malicious code, or for the use of third-party libraries with known security issues.

This solution provides advantages over systems that take a more extreme approach of disabling all installed extensions when a user is performing any sensitive transaction. This may lead to a poor user experience, or to the user becoming frustrated with the security solution and removing it. This leaves the user completely unprotected. Indeed, some extensions might be necessary or at least useful for certain domains, even if those domains include sensitive information. The system and method described herein uses a context-based approach to manage these extensions. The context may be, for example, the reputation of the domain and its category. Based on the category of the domain and the installed extension's purpose, a security and risk posture may be calculated. Extensions can then be automatically enabled or disabled to provide the user with the best cross-section of privacy, security, and utility.

This system also realizes advantages over existing systems that categorize risk based purely on permission analysis. In other words, the user decides to install or not to install an extension based solely on whether the user is comfortable giving the extension certain permissions. The method disclosed herein arrives at a reputation score using multiple parameters, including static and dynamic analysis of the extension. Parameters can be derived from the extension's store metadata.

The security reputation may also be based on whether, for example, the actual observed behavior of the extension matches the expected behavior from the manifest. Parameters can also be generated from source code analysis of the extension. This can identify, for example, external domain and URL references made by the extension, and the global URL reputation for those domains. It can also yield third-party library references in the extension, and these can be cross-referenced with known vulnerabilities for third-party libraries. A further input to an extension's reputation may include the reputation of the developer of the extension, and parameters generated by a threat detection service, with a database of known malicious code. The JavaScript (JS) code of the extension can also be analyzed and compared to known malicious code samples.

Parameters derived from dynamic analysis (e.g., execution time analysis) in a sandboxed mode may be used to look at system changes made by the extension. Thus, it can be observed whether the extension reads, writes, and/or updates cookies, makes network calls, has a payload, updates local storage, or similar. The security and privacy impact of the permissions for the extension can then be examined, including its use of internal application programming interfaces (APIs) for the browser.

The foregoing can be used to build or embody several example implementations, according to the teachings of the present specification. Some example implementations are included here as nonlimiting illustrations of these teachings.

There is disclosed an example computing endpoint, comprising: a hardware platform comprising a processor and a memory; an operating system to run on the hardware platform; a web browser to run on the operating system, and including an extension framework; and a management extension to run in the extension framework, and to contextually manage availability of other extensions according to a URL reputation and extension reputation.

There is further disclosed an example computing endpoint, wherein the management extension is to periodically, or upon installation of a new extension, query a cloud reputation service for a reputation for an installed extension.

There is further disclosed an example computing endpoint, wherein the management extension is to query a cloud reputation service for a URL reputation for a URL the browser navigates to.

There is further disclosed an example computing endpoint, wherein the URL reputation includes a URL category.

There is further disclosed an example computing endpoint, wherein the management extension is to contextually disable an extension that lacks utility for the URL category.

There is further disclosed an example computing endpoint, wherein the management extension is to disable the extension regardless of a security reputation of the extension.

There is further disclosed an example computing endpoint, wherein the management extension is further to provide a graphical user interface.

There is further disclosed an example computing endpoint, wherein the graphical user interface is to provide a security and privacy overview according to the other extensions.

There is further disclosed an example computing endpoint, wherein the management extension further comprises a recommendation engine to identify an installed extension.

There is further disclosed an example computing endpoint, wherein the extension reputation includes a categorical utility for an extension, the URL reputation includes a category for a URL, and the management extension is to disable the extension for the URL according to the categorical utility.

There is further disclosed an example computing endpoint, wherein the management extension is to disable the extension irrespective of a security or privacy reputation of the extension.

There is also disclosed an example of one or more tangible, non-transitory computer-readable media having stored thereon executable instructions to: provide an API connection into a web browser's extension framework; enumerate installed extensions for the web browser; receive from a first cloud service contextual reputation data for the installed extensions; detect that the web browser has accessed a domain; receive from a second cloud service a context for the domain; and disable an extension for the domain according to the contextual reputation and the context.

There is further disclosed an example of one or more tangible, non-transitory computer-readable media, further comprising instructions to provide a management extension, wherein the management extension is to periodically, or upon installation of a new extension, query a cloud reputation service for a reputation for an installed extension.

There is further disclosed an example of one or more tangible, non-transitory computer-readable media, further comprising instructions to provide a management extension, wherein the management extension is to query a cloud reputation service for a URL reputation for a URL the browser navigates to.

There is further disclosed an example of one or more tangible, non-transitory computer-readable media, wherein the URL reputation includes a URL category.

There is further disclosed an example of one or more tangible, non-transitory computer-readable media, wherein the management extension is to contextually disable an extension that lacks utility for the URL category.

There is further disclosed an example of one or more tangible, non-transitory computer-readable media, wherein the management extension is to disable the extension regardless of a security reputation of the extension.

There is further disclosed an example of one or more tangible, non-transitory computer-readable media, further comprising instructions to provide a management extension, wherein the management extension is further to provide a graphical user interface.

There is further disclosed an example of one or more tangible, non-transitory computer-readable media, wherein the graphical user interface is to provide a security and privacy overview according to the other extensions.

There is further disclosed an example of one or more tangible, non-transitory computer-readable media, further comprising instructions to provide a management extension, wherein the management extension further comprises a recommendation engine to identify an installed extension.

There is further disclosed an example of one or more tangible, non-transitory computer-readable media, further comprising instructions to provide a management extension, wherein the contextual reputation includes a categorical utility for an extension and a category for a URL, and the management extension is to disable the extension for the URL according to the categorical utility.

There is further disclosed an example of one or more tangible, non-transitory computer-readable media, wherein the management extension is to disable the extension irrespective of a security or privacy reputation of the extension.

There is also disclosed an example method of providing contextual management of extensions to a web browser, comprising: enumerating a plurality of installed extensions; querying an extension reputation service for reputations for the installed extensions; querying a URL reputation service for a reputation for a URL visited by the browser, including a URL category; assigning the installed extensions contextual reputations according to their reputations and the URL category; and selectively enabling or disabling the installed extensions according to their contextual reputations.

There is further disclosed an example method, further comprising periodically, or upon installation of a new extension, querying a cloud reputation service for a reputation for an installed extension.

There is further disclosed an example method, further comprising querying a cloud reputation service for a URL reputation for a URL the browser navigates to.

There is further disclosed an example method, wherein the URL reputation includes a URL category.

There is further disclosed an example method, further comprising contextually disabling an extension that lacks utility for the URL category.

There is further disclosed an example method, further comprising disabling the extension regardless of a security reputation of the extension.

There is further disclosed an example method, further comprising providing a graphical user interface.

There is further disclosed an example method, wherein the graphical user interface is to provide a security and privacy overview according to the other extensions.

There is further disclosed an example method, further comprising providing a recommendation engine to identify an installed extension.

There is further disclosed an example method, wherein the contextual reputations include a categorical utility for an extension, the URL reputation includes a category for a URL, and contextual management of extensions further comprises disabling the installed extensions for the URL according to the categorical utility.

There is further disclosed an example method, wherein contextual management of extensions further comprises disabling the installed extensions irrespective of a security or privacy reputation of the installed extensions.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

There is also disclosed an example cloud service, comprising: a cloud hardware platform; a collection software module to collect browser add-on data from a browser add-on store; a download software module to download source code for the browser add-on data; and a static analysis software module.

A system and method for providing contextual management of browser extensions will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Security services provider 190 may maintain a database of global URL reputations, as well as a database of contextual extension reputations.

In an example use case:
1. User 120 navigates to a desired domain via browser 112.
2. Management extension 114 running on browser 112 as an extension fetches from security services provider 190 the category and reputation of the domain. For example, MCAFEE, LLC provides the GTI service, which provides a database of URL reputations.
3. Management extension 114 also fetches the reputation scores of installed extensions. For example, management extension 114 may fetch the reputation scores from security services provider 190, which may provide this as part of the same service that provides the URL reputations, or as a separate service. Furthermore, this could be provided by a separate service provider. In some cases, management extension 114 may periodically, or upon the installation of a new extension, prefetch the reputation of installed extensions from a cloud service. These can be then be cached locally. This provides for quicker decision-making, as there is no need to fetch the reputations of each extension every time a URL is visited. These may be updated periodically to ensure that management extension 114 maintains good, up-to-date reputations for the installed extensions.

4. A reputation engine running on management extension 114 may compute an overall reputation score for each extension. This reputation score may account for factors such as security, privacy, and domain-specific utility. It may also include additional information about the extension, such as under which circumstances the extension is safe or risky. It may also account for how the extension behaves when used in the context of different domain categories. This information provides a map of domain categories for which an extension is safe to run under.

5. Management extension 114 then uses the URL category and the reputation score of the installed extensions to arrive at a list of extensions that are safe to run for the currently accessed domain or URL. It also determines which extensions are unsafe in that context.

6. Management extension 114 can then automatically enable or disable extensions for as long as the user is accessing the given URL.

7. In some cases, if the reputation of the installed extension is bad enough, irrespective of the URL category or the accessed domain, the extension may be automatically disabled. The user may also be provided with a warning, and optionally with advice. For example, the user's installation of this extension may indicate a desire on the user's part to have certain functionality within the browser. If the global extension reputation database includes an extension with the same or similar functionality and with a higher reputation, it may recommend to the user the installation of this better option for the extension. In some cases, the user may be able to manually override the blocking of certain extensions, although this may be done with a warning that it is unsafe to do so.

In an example, in addition to management extension 114, browser 112 includes extension 1 115, extension 2 116, and extension 3 117. Extension 1 115 and extension 2 116 both have clipboard access and can read data on all sites. If user 120 navigates to a social networking domain, the URL category for the domain may be fetched from security services provider 190. An extension reputation cloud service may also have classified extension 1 115, extension 2 116, and extension 3 117 for security and utility.

In this case, management extension 114 may determine that extension 1 115 has a contextual reputation that makes it safe to run on social networking domains of this type. However, it may determine that extension 2 116 and extension 3 117 have a reputation that is contextually low for this social networking site. This may be based, for example, on security and privacy ratings, as well as on utility for the particular domain. Management extension 114 disables extension 2 116 and extension 3 117 while user 120 is visiting this particular domain. Extension 1 115 is enabled on this particular domain.

On the other hand, extension 3 117 might be a password manager, while extension 1 115 and extension 2 116 provide other features. If user 120 visits a banking website, extension 3 117 may be enabled on that baking website only if it has a sufficiently high security and privacy score. If it has a medium to low security and privacy score, it may be disabled, even though it provides a useful function for the banking website. Extension 1 115 and extension 2 116 may both be disabled on the banking website, irrespective of their security and privacy scores, because they have low utility on a banking website, and thus there is little to no benefit in enabling them here.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying browser 112 (which may be running in memory), or gaining access to local resources. Furthermore, attacks may be directed at internet of things (IoT) objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Browser 112 may provide a framework or an API for extensions, add-ons, plug-ins, or similar. These may be broadly referred to as extensions for browser 112. Such extensions enhance or increase the functionality of browser 112. As discussed above, the most popular browsers have many thousands of extensions available for them, which perform a variety of functions such as ad blocking, grammar checking, password storage, plug-in shopping utilities, travel advisories, and many other functions. In some cases, attacker 180 may create malicious extensions, which deliberately collect sensitive user information and/or PII. However, even if attacker 180 does not deliberately develop a malicious extension, developer 184 may negligently develop an extension that leaks data, or that compromises security. For example, developer 184 may be an inexperienced developer who simply does not have the skill set to develop a secure extension, or even if developer 184 is highly skilled, she may use a third-party JS API or library that has known security vulnerabilities that have not been patched. Thus, while this library may provide some functionality that developer 184 finds beneficial, by including it, she introduces security vulnerabilities into her extension.

Thus, it may be desirable to include within browser 112 a management extension 114 that provides contextual security and management of other installed extensions.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
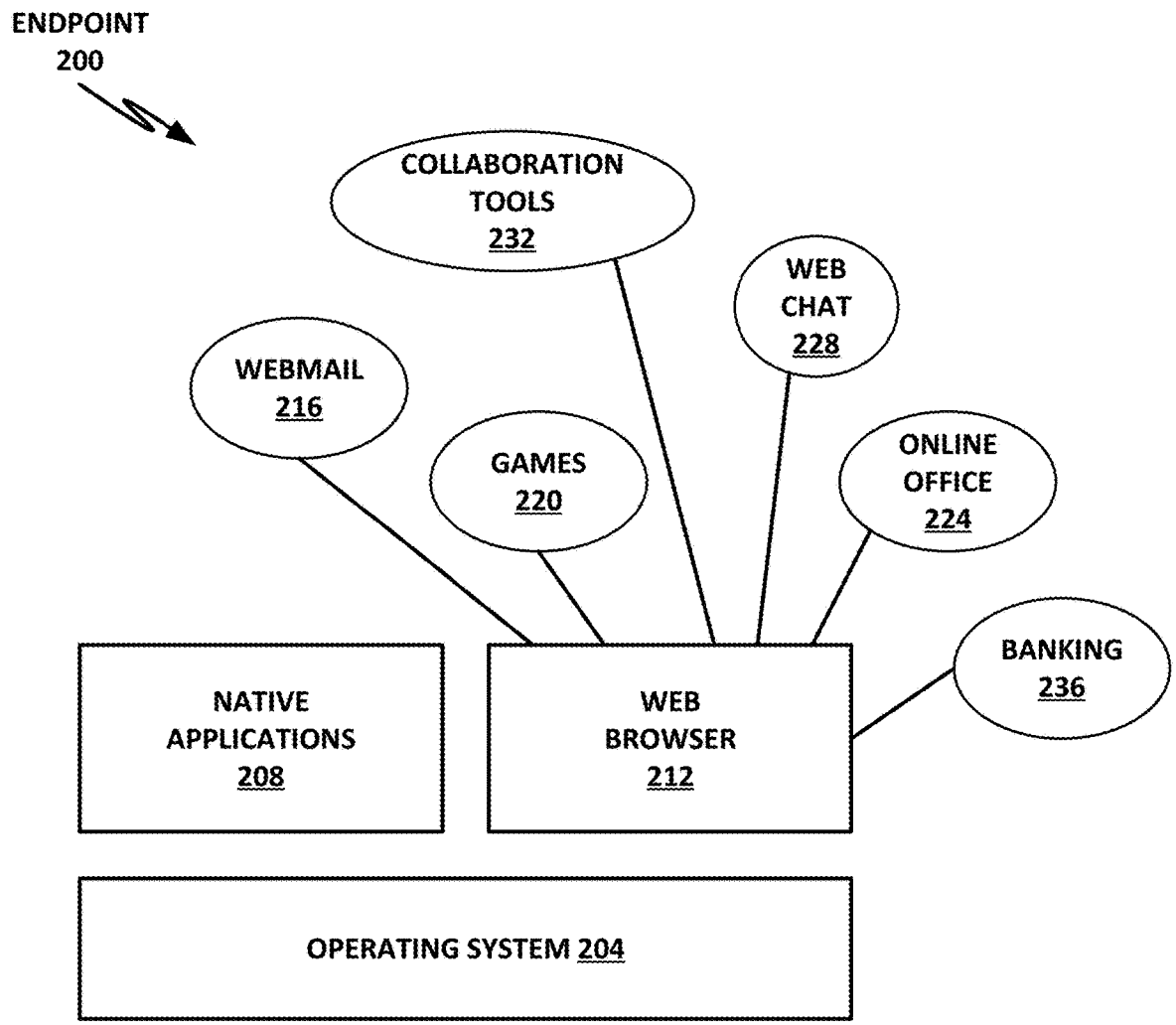
FIG. 2 is a block diagram illustrating selected elements of an endpoint device.

FIG. 2 is a block diagram illustrating selected elements of an endpoint device 200. In this case, endpoint device 200 provides a software architecture, including an operating system 204, which may run on a hardware platform.

Operating system 204 provides low-level input/output (I/O) access, and other services to endpoint 200, and enables other software elements within the software ecosystem to execute.

On top of operating system 204, there is running a web browser 212, as well as other native applications 208. Note that in many modern use cases, web browser 212 itself becomes a second-tier operating system. Many applications are now web-based, so rather than running native applications 208 on operating system 204, many users will run a large portion of their software stack on top of web browser 212. This can include, by way of illustrative, nonlimiting example, a webmail client 216, web-based games 220, an online office suite 224, a collaborate web chat or videoconferencing suite 228, online collaboration tools 232, and/or a banking application 236. There are many other web-based applications that a user might elect to use, and when these run in the web browser, the web browser essentially provides a new software stack on top of operating system 204.

In many cases, users may install specific extensions that are beneficial and useful for particular web applications. For example, a grammar checker may be useful in the webmail 216 context, the online office 224 context, the web chat 228 context, and/or the collaboration tools 232 context. However, a grammar checker may be contextually less useful for online games 220. Furthermore, any extension that does not provide direct support for the banking context 236 may be a potential vector for data leakage when the user is interacting with sensitive banking resources.

On the other hand, because almost all web-based services require some sort of authentication, a password manager may be contextually useful for practically any web service. Thus, even in the context of banking, where there is a premium on protecting sensitive information, it may be preferable to allow a password manager to preserve the user experience. However, because the user is far less likely to compose a document on the banking website 236, the grammar checker has much less utility on that site, and thus represents a potential security vector with little to no benefit.

Thus, in the context of banking 236, where the sensitivity of information is high and the danger of data leakage is correspondingly high, it is beneficial to restrict all but the most valuable extensions to that context. Indeed, even if the grammar checking plug-in has a very high security reputation, its very low utility score in the banking context means that it may be best simply to disable that plug-in on the banking website as a matter of data loss prevention.

Figure 3:
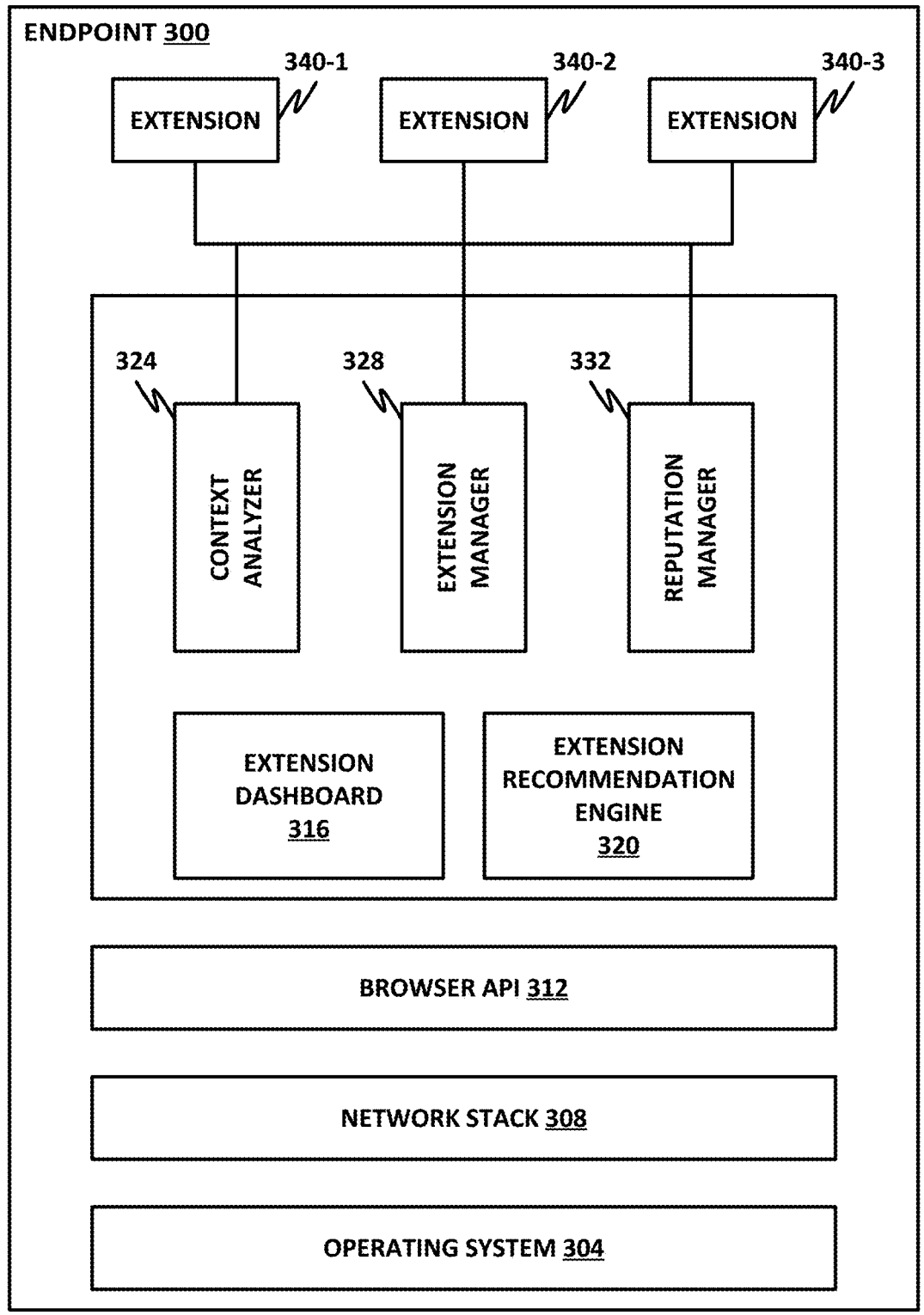
FIG. 3 is a block diagram of selected aspects of an endpoint.
Figure 4:
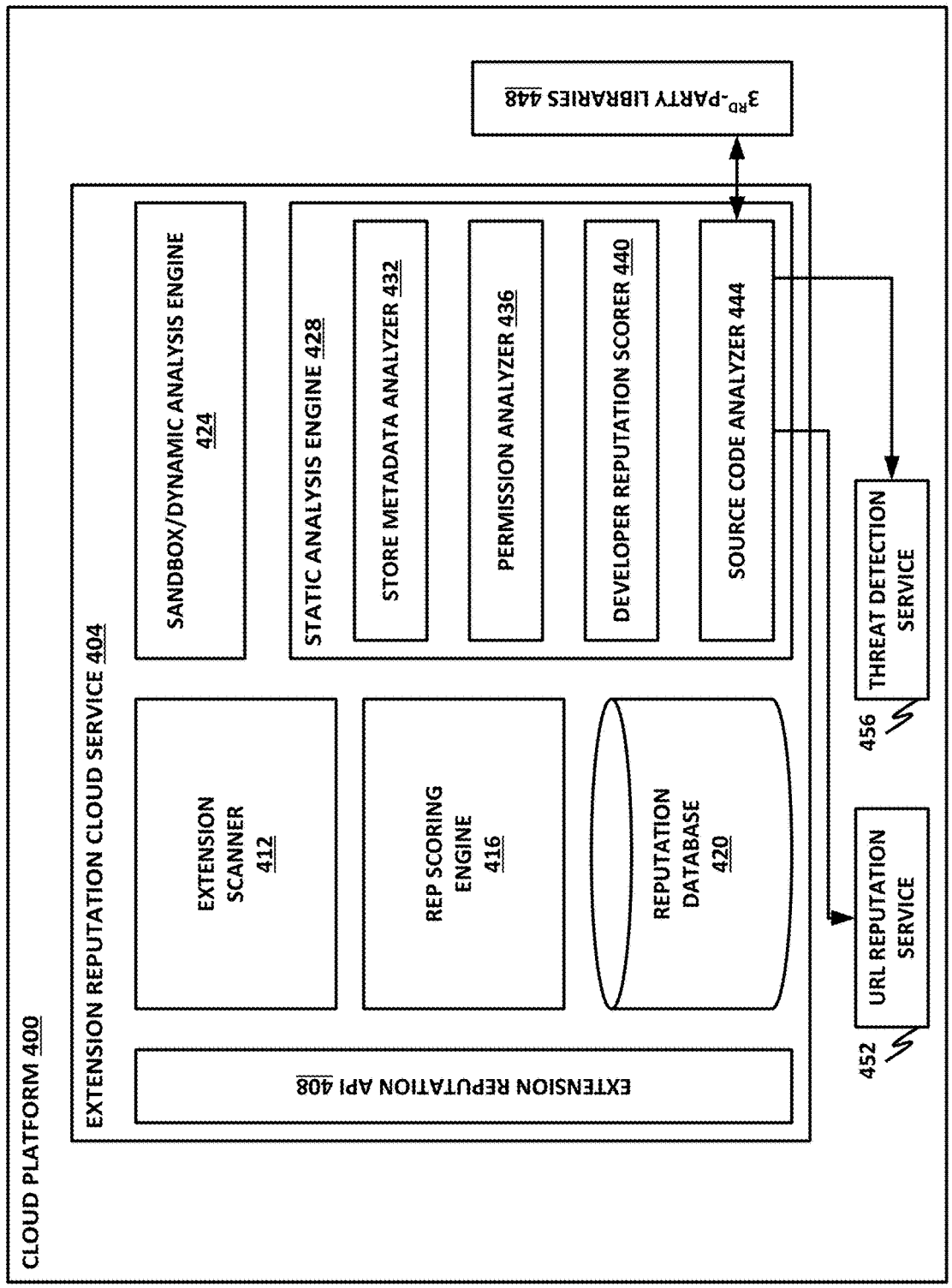
FIG. 4 is a block diagram of a cloud platform.
Figure 5:
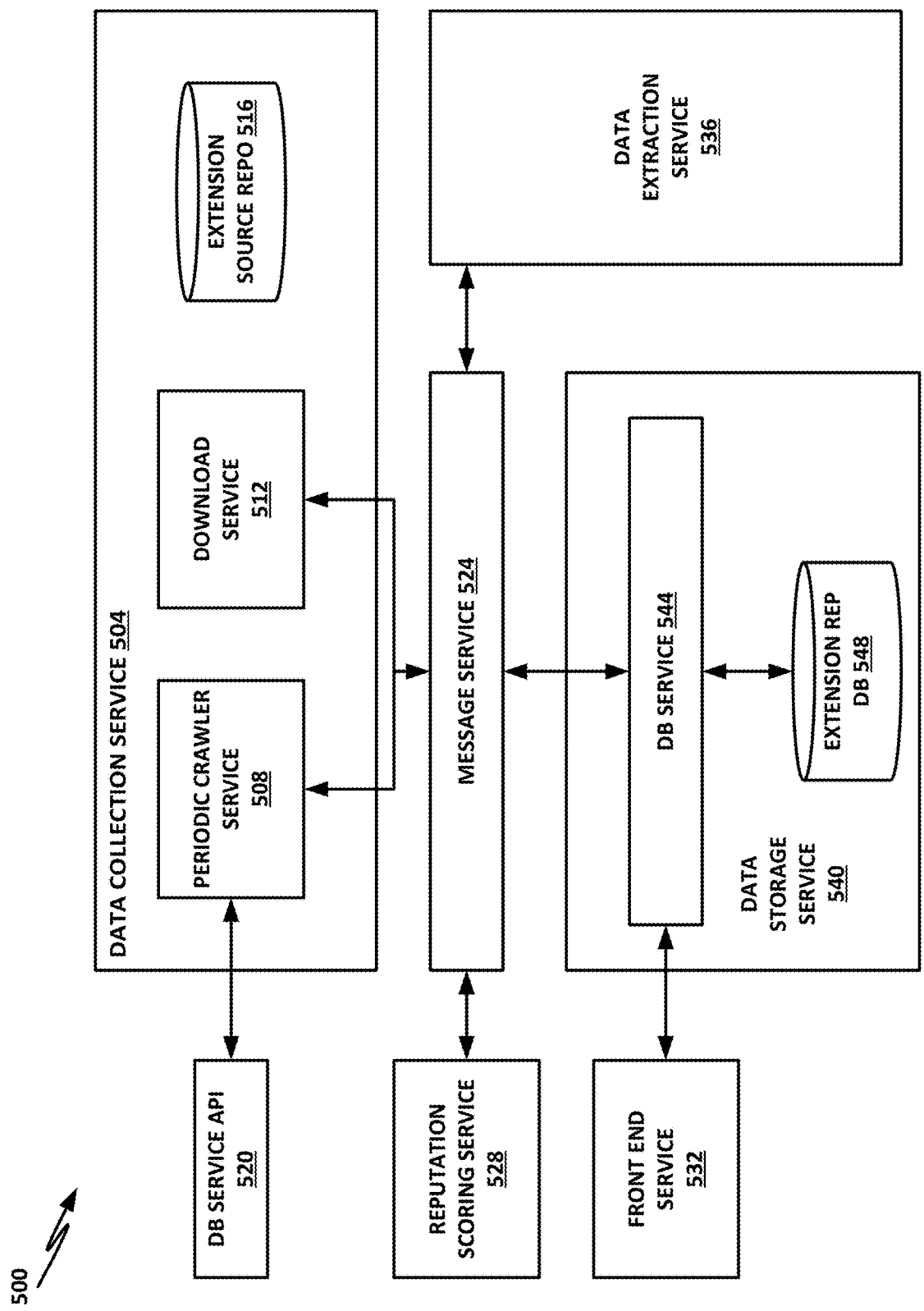
FIG. 5 is a block diagram of selected elements of a cloud service.
Figure 6:
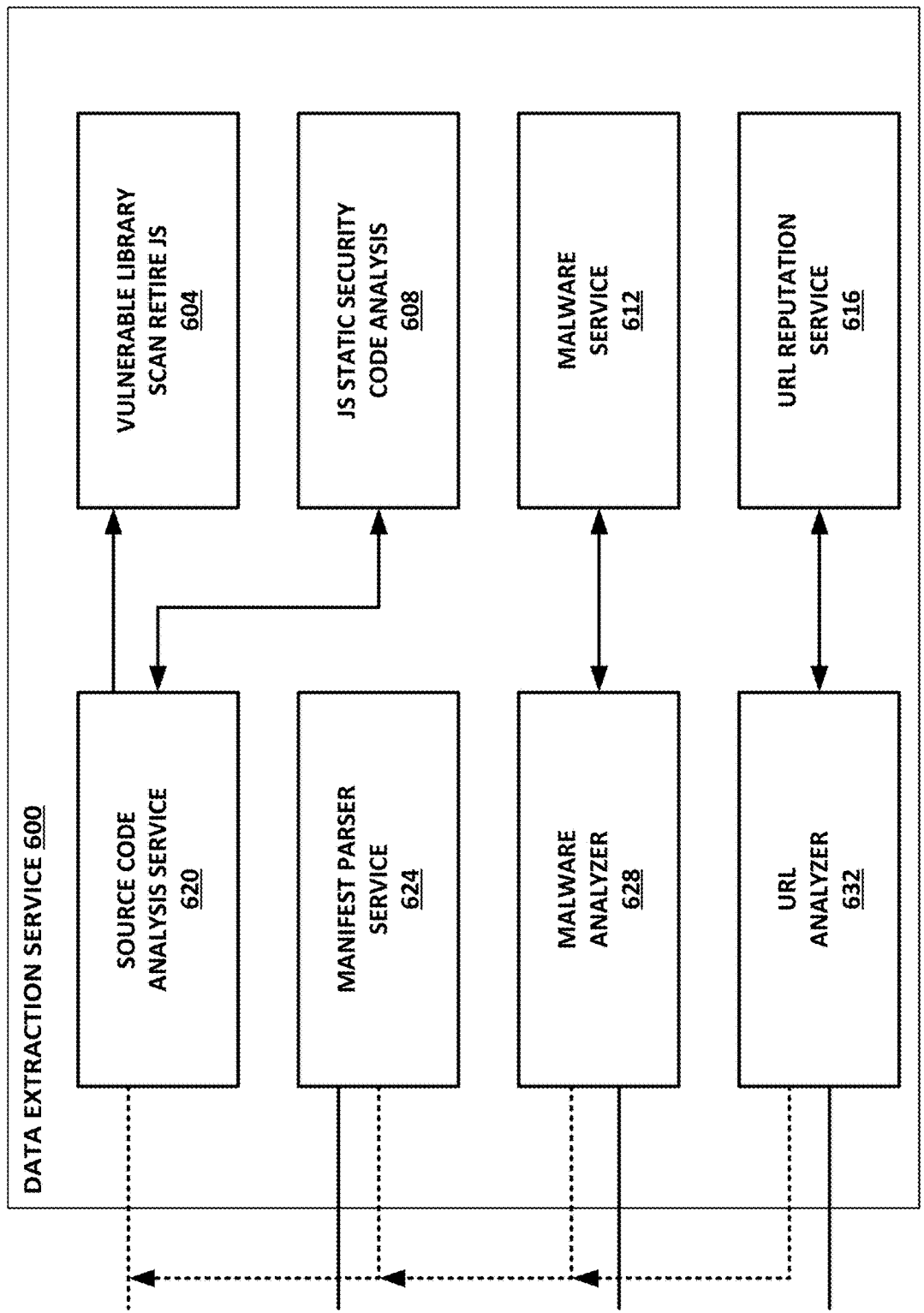
FIG. 6 is a block diagram illustration of a data extraction service.

A contextual extension management system of the present specification may include, in some embodiments, both client-side functionality and server-side functionality. Certain aspects of the client side are illustrated in FIG. 3, while aspects of the server side are illustrated in FIGS. 4, 5, and 6, below. These divisions between client and server are provided by way of illustrative and nonlimiting example, only. It should be understood that in other embodiments, various functions may be provided on the client or server side, as appropriate to the embodiment.

Figure 9:
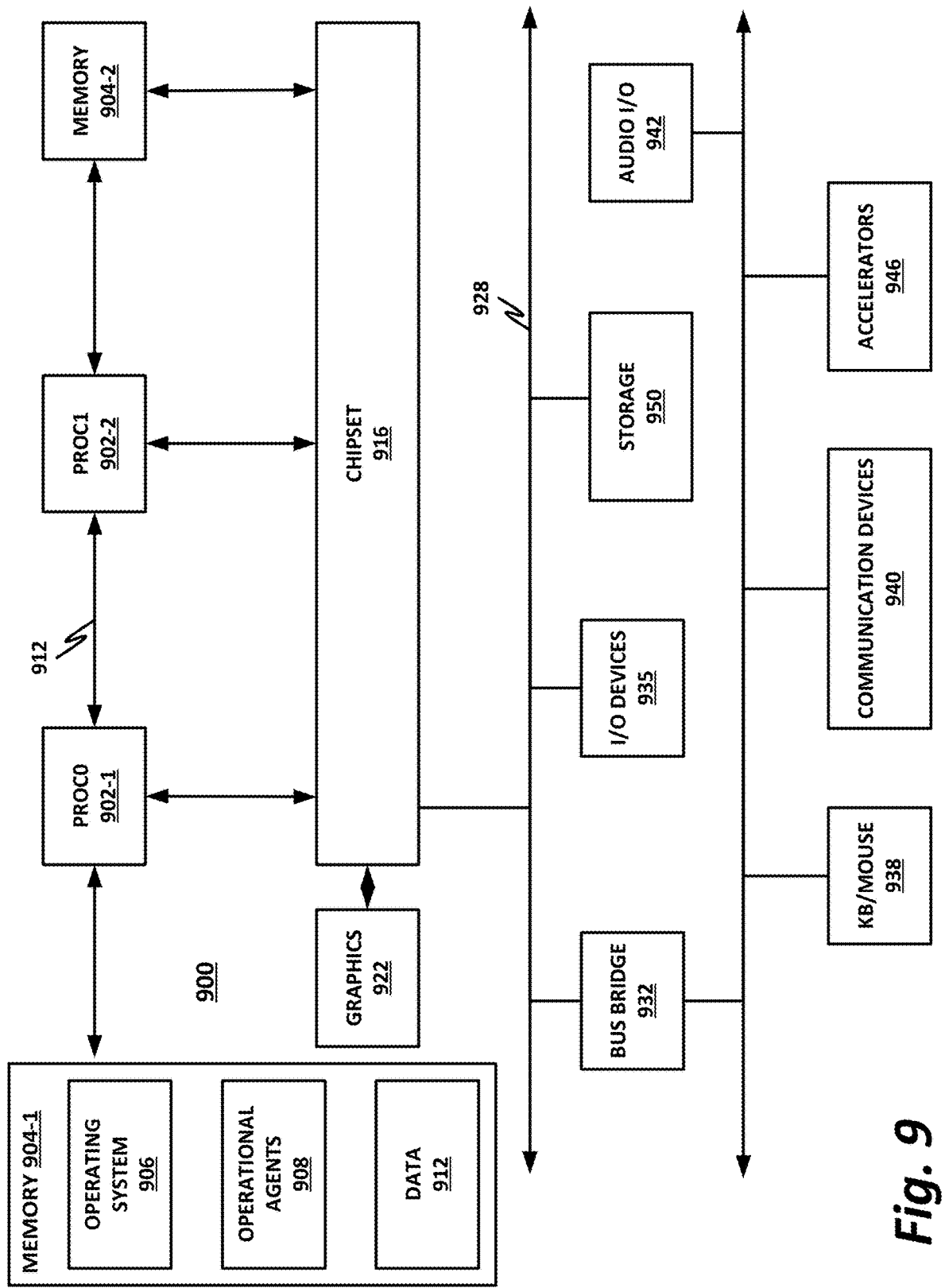
FIG. 9 is a block diagram of selected elements of a hardware platform.
Figure 10:
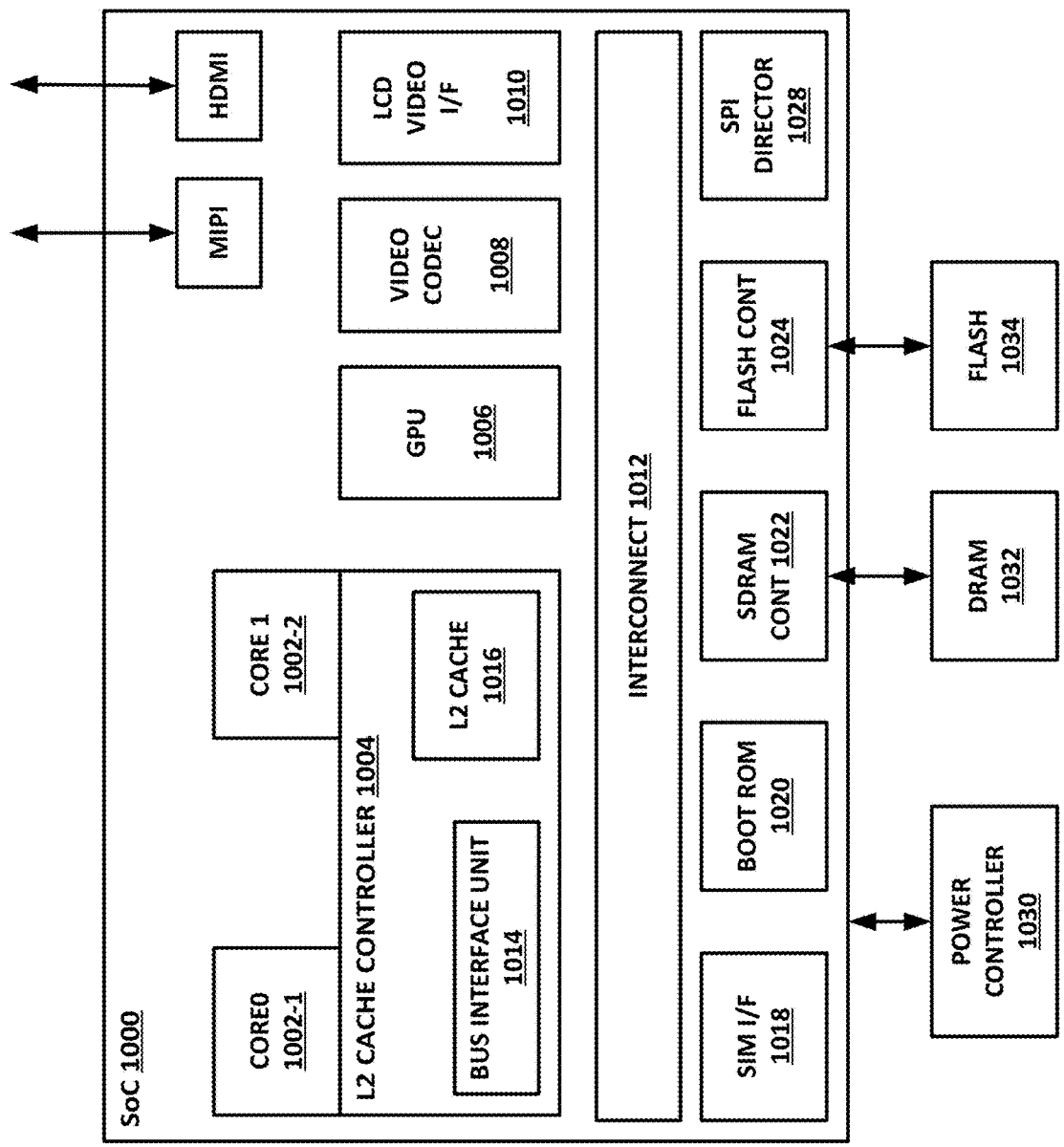
FIG. 10 is a block diagram of selected elements of a system-on-a-chip (SoC).

FIG. 3 is a block diagram of selected aspects of an endpoint 300. Endpoint 300 may be based on a hardware platform which may provide, for example, a processor, memory, networking hardware, human interfaces, and similar. FIGS. 9 and 10 below illustrate additional aspects of example hardware platforms.

Endpoint 300 provides an operating system 304. Operating system 304 may provide, as discussed above, certain low-level device drivers, input/output operations, and other low-level functionality and services for the operating system. Operating system 304 may also provide a command shell, a graphical user interface (GUI), or other aspects of the system.

A network stack 308 provides the networking hardware, software, and/or firmware to provide networking operations. Various networking stacks are known, including traditional seven-layer stacks, such as the transmission control protocol/internet protocol (TCP/IP) stack and the open systems interconnection (OSI) seven-layer stack.

Browser API 312 is a framework or application programming interface that enables certain extensions to interoperate with a browser running on operating system 304 and using network stack 308.

In this example, various extensions plug in to browser API 312. These include extension 340-1, extension 340-2, extension 340-3, and an extension manager 328.

Management extension 328 is itself a browser extension. Management extension 328 may be configured to detect the user's browsing contexts, monitor installed extensions, fetch reputations for URLs and/or extensions, compute extension reputations based on identity and context, and manage installed extensions, including on a per-context basis, according to the current URL.

To perform these functions, management extension 328 includes a context analyzer 324. Context analyzer 324 may be configured to carry out various algorithms according to the teachings of the present specification, including analyzing the content as various extensions 340. For example, context analyzer 324 may fetch URL data from a global URL database, and determine both the reputation of a URL and its context, such as its category. Context analyzer 324 can then determine the current browsing context based on a URL the web browser is currently visiting.

Reputation manager 332 may periodically poll a cloud-based extension reputation database for reputation information about various extensions. It may also query the database when a new extension is installed via browser API 312. Reputation manager 332 may also maintain extension reputations up-to-date, by periodically updating its reputation data. Reputation manager 332 may then cooperate with context analyzer 324 to compute a contextual reputation for each extension, according to the current browsing context. For example, reputation manager 332 may account for the category of the current URL, as well as the reputation for security and privacy of each installed extension 340.

Based on reputation data from reputation manager 332, and/or contextual data from context analyzer 324, extension manager 328 may enumerate installed extensions 340, and determine for each extension whether it is to be enabled or disabled in the current context. Extension manager 328 then enables and/or disables extensions according to their contextual reputation for the current domain.

Management extension 328 may also include additional functionality, such as an extension dashboard 316, and/or an extension recommendation engine 320. Extension dashboard 316 may help the user to get an overall security posture of the installed extensions. For example, extension dashboard 316 may provide a simple graphical representation of an extension's overall reputation, using simple visual indicators such as colors (e.g., green, yellow, orange, and/or red) to indicate the overall reputation for privacy and security of an extension.

Recommendation engine 320 may provide recommendations for how the overall security posture of the system can be improved. For example, recommendation engine 320 may recommend removing some extensions, and/or replacing other extensions. For example, if the user has installed an extension with a poor reputation for reliability, security, and/or privacy, recommendation engine 320 may query a global extension database for a similar extension that provides similar or identical functionality, but that has a better reputation.

In some embodiments, whenever there is an automated update to an installed extension, or when a new extension is installed, reputation manager 332 may query the cloud extension reputation database to get a reputation for the updated or newly installed extension. The user may then be notified if there is an updated risk assessment for that extension.

The user may then be notified, for example, via extension dashboard 316, if there is an updated risk profile associated with the extension. If the newly installed or updated extension has negatively impacted the overall security of the system, the user may be given the option to disable or remove the extension to improve system security.

FIG. 4 is a block diagram of a cloud platform 400. Cloud platform 400 may be configured with certain logical modules or functions that provide various services to the cloud infrastructure. Cloud platform 400 may provide a cloud service that is responsible for continuously monitoring new or updated extensions from an extension store, for one or more target browsers. It can also monitor the removal of extensions, and provide appropriate security updates for removal. When new or updated extensions are found, these extensions may be scanned, and metadata about the extensions may be fetched on the extension store. The cloud service can then download the source code of the extension, run the source code through a series of parsers to extract various parameters, and perform other analysis on the extension.

In this example, cloud platform 400 may be based on a hardware platform. The hardware platform may provide a single, monolithic computing system, such as a highly capable server, or it may provide a more disaggregated hardware platform, such as across numerous servers and/or racks in a data center. Each of the various logical blocks disclosed within cloud platform 400 could be act as a discrete standalone server, as a virtual machine, as a microservice, as a container, or in any other discrete configuration. Furthermore, in some embodiments, two or more logical blocks may be combined into a discrete server, virtual machine, microservice, container, or similar.

Within cloud platform 400, there is provided an extension reputation cloud service. Extension reputation cloud service 404 works in conjunction with a URL reputation service 452, and a threat detection service 456. Note that URL reputation service 452 may include certain existing URL reputation services, such as MCAFEE, LLC's GTI database, or similar. Furthermore, threat detection service 456 may include certain existing services, such as MCAFEE, LLC's Advanced Threat Detection (ATD), which provides global reputations for binary objects, certain source code chains, or other objects.

Extension reputation cloud service 404 includes an extension reputation API 408. Extension reputation API 408 provides an interface by which outside agents (such as endpoints) can access the services of extension reputation cloud service 404.

In this example, extension reputation cloud service 404 includes an extension scanner 412, a reputation scoring engine 416, a reputation database 420, a dynamic analysis engine or sandbox 424, and a static analysis engine 428. Extension reputation cloud service 404 interacts with a URL reputation service 452, a threat detection service 456, and a third-party library service 448. Third-party library service 448 may provide analysis and/or reputations of certain third-party libraries, and may also include a database of reputations for old or outdated versions of third-party libraries.

Extension scanner 412 may include logic to periodically scan an extension store associated with a browser or a plurality of browsers. For example, extension scanner 412 may periodically scan extension stores for Chromium, Firefox, Safari, Opera, and/or other browsing applications. This can identify newly added extensions, as well as updated extensions. It may also identify extensions that have been removed from the store, which would imply that, in some cases, they should also be removed from endpoint devices as no longer supported.

Reputation scoring engine 416 uses sandbox 424, static analysis engine 428, and inputs from URL reputation service 452, threat detection service 456, and/or third-party library service 448 to assign reputations to various extensions. These reputations may be multidimensional reputations, and may include reputations for functionality, utility, stability, privacy, security, data integrity, and others. Once an extension has been analyzed, the reputation data are persisted in a reputation database 420, on a per-version basis. Furthermore, the reputation of a particular version may periodically be updated, and the new reputation may then supplant the old reputation as the reputation returned by reputation database 420. Furthermore, reputation database 420 may track reputation changes, both across versions and across the same version, if there are changes to the reputation when new information about a version is discovered.

Reputation scoring engine 416 may rely on inputs from sandbox or dynamic analysis engine 424. Sandbox 424 provides an enclave environment in which the extension can be run on a mocked-up system. This could be, for example, a virtualized environment, where expected features or characteristics of real-world deployments are emulated. Sandbox 424 runs extensions in these mocked-up environments, including using mock data while visiting real websites of various categories. Sandbox 424 can then observe the behavior of the extension, including observing whether there is data leakage, whether there is poor memory usage or memory leakage, whether the extension appears to be visiting a malicious URL or uploading data to an outside URL, or performing some other non-authorized or undesirable activity. This dynamic analysis can supplement static analysis. For example, if static analysis engine 428 determines that the source code references certain suspicious-looking URLs, this may negatively impact the reputation for the extension. However, if sandbox 424 determines that the extension does not actually access these URLs, or that it accesses them in a benign way, then the negative impact on the reputation may be reversed.

Dynamic analysis engine 424 performs a sandboxed dynamic analysis of every new extension and update to existing extensions. The sandboxed analysis may include running the extension programmatically in a controlled environment, and monitoring its behavior. In one example, the system uses a list such as Amazon Alexa's top 100 websites of different URL categories (both good and bad). The system may monitor access to the top 100 websites. It may also monitor changes to the local storage, network calls made, payloads of network calls, and cookies written or read by the extension. The behavior of the extension may be analyzed for each of the domain categories, to provide a security and privacy risk score for running the extension.

Static analysis engine 428 provides various sub-elements, which themselves may be provided by one or more virtual machines, microservices, containers, standalone servers, or similar.

Store metadata analyzer 432 analyzes metadata associated with the extension, as provided by the extension store. The metadata may include determining who the developer of the extension is, what permissions it should have, its size, its expected memory footprint, and its expected behavior. Note that these metadata are often provided voluntarily by the author of the extension. Thus, it may be beneficial to verify these metadata. In that case, one dimension of static analysis may include the behavior and attributes of the extension, as reported by the metadata. A second dimension may include whether the observed behavior, as determined by dynamic analysis of sandbox 424, actually matches the reported or expected behavior in the metadata.

The system could also keep track of extensions banned from the store. The data may be fetched through external sources. The parameters extracted from banned extensions may be used for analyzing the permissions used, what security and privacy threats are present, and risks exhibited by the extension. These data can be used not only to score individual extensions, but also to improve the scoring algorithm, on the assumption that when an extension is removed, it was removed because it behaved badly.

Permission analyzer 436 determines which permissions the extension requests, and can correlate those with the desirability of granting such permissions to particular domains or URL categories.

Developer reputation scorer 440 may analyze or assign a reputation to the developer of the extension. For example, the system may keep track of all developers who have published extensions to an extension store. The reputation may be influenced by factors such as how many extensions a developer has published, the number of downloads for each public extension, how frequently the developer publishes an update to the extension, if there are any breaches for published extensions that resulted in removal of the extension from the store, or other reputation factors. These data can be used to arrive at an overall reputation for the developer, which in some cases could be a multidimensional reputation.

Source code analyzer 444 analyzes the JS source code of the extension. For example, extensions generally have a content script (active when a user visits a webpage), and a background script, which may be always active. Currently, the largest extension stores require extension authors to provide their source code in a format that is understandable. In other words, extension developers are not permitted to obfuscate their source code. And indeed, if an extension developer obfuscates his source code, that in itself may be deemed suspicious. However, the large extension stores do not currently analyze the extension source code for security, utility, and/or vulnerability. Rather, they are primarily concerned with ensuring that webpages cannot damage the extensions, rather than vice versa.

Thus, source code analyzer 444 may analyze the source code (e.g., JavaScript) and check it for malicious activity. Portions of the JS code can also be checked against threat detection service 456, to see if the source code appears to use known malicious code fragments. Any URLs identified within the source code can be checked against URL reputation service 452, to determine what the reputations of those URLs are. Note that reputation service 452 could be the identical service that is used for determining contextual reputations of extensions during browsing.

Source code analyzer 444 can also identify third-party libraries used by the source code. These third-party libraries can be checked against a third-party library service, to determine whether the extension is using the most up-to-date version of the third-party library, and whether the version used has known security vulnerabilities.

FIG. 5 is a block diagram of selected elements of a cloud service 500. The diagram of FIG. 5 is particularly suited to the illustration of messaging between various components within the network. To this end, a messaging service 524 communicatively couples to various components of cloud service 500. Messaging service 524 may, in one example, use a publish/subscribe-type messaging service, such as Apache Kafka or Open Data Exchange Layer (OpenDXL).

In this example, cloud service 500 includes a data collection service 504, which includes a periodic crawler service 508, a download service 512, and an extension source repository 516. It also includes a data storage service 540, which includes a database service 544 and an extension reputation database 548. Database service 544 communicates via a front end service 532, which exposes certain API calls to client devices. It also provides database service API 520, which can be used to communicate within cloud service 500, including to communicate with data collection service 504.

Cloud service 500 also includes a data extraction service 536.

FIG. 6 is a block diagram illustration of a data extraction service 600. By way of nonlimiting example, data extraction service 600 may be data extraction service 536 of FIG. 5, or may be a similar data extraction service appropriate to embodiments of the present specification. Data extraction service 600 includes a source code analysis service 620, a manifest parser service 624, a malware analyzer 628, a URL analyzer 632, a vulnerable library scanning service 604, and a JS static security code analysis service 608. Either internal or external to data extraction service 536, there may also be a malware service 612, and a URL reputation service 616.

By way of illustrative example, the various modules disclosed in FIG. 5 may publish and/or subscribe to certain messages. These signals and their publishers, subscribers, parameters, and other data are all provided by way of illustrative and nonlimiting example in Table 1, below.

TABLE 1

Publish/Subscribe Topics and Parameters

| Message Topic | Parameters | Publisher | Subscriber |
| --- | --- | --- | --- |
| NewExtension | {id, name, version, URL, Metadata} | Periodic Crawler Service 508 | Download Service 512 |
| updateAvailable | {id, name, version, URL, Metadata} | Periodic Crawler Service 508 | Download Service 512 |
| ReputationScoreUpdated | {id, name, version, reputation data} | Reputation Scoring Service 528 | DB Service 544 |

TABLE 1-continued

Publish/Subscribe Topics and Parameters

| Message Topic | Parameters | Publisher | Subscriber |
| --- | --- | --- | --- |
| new DataNotAvailable | {id, version} | DB Service API 520 | Periodic Crawler Service 508 |
| new DataAvailableForScoring | {id, name, version, data for scoring (json)} | DB Service 544 | Reputation Scoring Service 528 |
| extensionDownloaded | {id, name, version, URL, download location} | Download Service 512 | Source Code Analysis Service 620 |
| Extraction Complete | {id, name, version, content type, json-content} | URL Analyzer 632 | DB Service 544 |

By way of illustrative example, cloud service 500 may perform the following procedure.

1. Periodic crawler service 508 queries an extension store to determine if new extensions are available, or if new versions of existing extensions are available. If a new extension is found, then periodic crawler service 508 publishes the topic "NewExtension." If an update is available, then it publishes "updateAvailable."
2. Using database service API 520, periodic crawler service 508 accesses extension reputation database 548 to determine if there is an existing reputation for the newly discovered extension. It also adds the URL associated with the extension, a version number, and an extension list to the reputation database so that a new reputation can be assigned, as necessary. Periodic crawler service 508 also subscribes to the topic "new DatallotAvailable," so that it can determine that a new ID and version number is not available for the extension.
3. Download service 512 subscribes to the topics "NewExtension" and "updateAvailable." Download service 512 downloads the source code for the extension, to extension source repository 516. Download service 512 then publishes the message "extensionDownloaded."
4. Data extraction service 536 consumes the topic "extensionDownloaded," and then analyzes the extension. For example, source code analysis service 620 may analyze the source code using existing static analysis techniques. Source code analysis service 620 may also query a vulnerable library JS repository 604. This indicates whether the source code uses any third-party libraries, including libraries with a poor reputation, or deprecated versions of a library that have known security vulnerabilities. Source code analysis service 620 also operates a JS static security code analysis service 608. This provides static code analysis of the overall source code. Manifest parser service 624 may parse the manifest, and analyze the metadata associated with the extension to perform risk assessment according to the metadata. Malware analyzer 628 may subscribe to malware service 612, and may look for known malicious code or code fragments within the source code. This can be done via textual analysis, hashing, binary analysis, image-based analysis, or similar. URL analyzer 632 may scan the source code for any URLs that appear in the source code. URL analyzer 632 may subscribe to a URL reputation service 616, and may retrieve therefrom reputations for any URLs that appear within the source code. Based on the overall analysis of data extraction service 536, the service publishes the topic "Extraction Complete."
5. Data storage service 540 consumes the topics "extensionDownloaded" and "Extraction Complete." Appropriate data are stored in the extension reputation database 548.
6. Depending on whether new data have been made available, data storage service 540 may publish one of "DatallotAvailable" or "DataAvailableForScoring."
7. Reputation scoring service 528 consumes the topic "new DataAvailableForScoring." Based on the available data, reputation scoring service 528 computes a new reputation score for the extension.
8. Reputation scoring service 528 publishes the topic "ReputationScoreUpdated."
9. Operating DB service API 520, data storage service 540 exports to front-end service 532 appropriate data, such as the URL, version, and reputation for a particular extension identified, for example, by extension ID and version.

In performing static analysis of a particular extension or a version of an extension, a scoring algorithm may be used. In one illustrative example, the scoring may be based on parameters grouped under several different categories. The risk score for an extension is increased by some number of numerical units when an unfavorable parameter is found. In this algorithm, as in golf, low score wins. In other words, an extension has a better reputation the lower its score is. Parameters considered in the static analysis may include:

Sentiment analysis: May be performed based on user feedback about installed extensions. If the user sentiments are unfavorable, this may increase an extension's utility risk score.

Number of downloads: If the extension has very few downloads, this may increase the privacy, security, and utility risk scores for the extension.

Number of stars: Utility risk score of the extension may be increased if the user sentiments are unfavorable.

Age of the extension: May increase the security and privacy risk score if the extension is fairly new in the Chrome store.

Description provided (at least 100 words): May increase the security and privacy risk score if the extension has no description.

Number of updates to this extension: May increase the security and privacy risk score if the extension has no updates for a significant period of time.

Developer details: May increase the security and privacy risk score if the developer is an individual.

Number of downloads for extensions from the developer: May increase the security and privacy risk score if the number of downloads is below a threshold.

Address details (available or not): May increase the security and privacy risk score if the address is not provided by the extension developer.

Support contact number (available or not): May increase the security and privacy risk score if a support contact is not provided by the extension developer.

Support e-mail (available or not): May increase the security and privacy risk score if a support e-mail is not provided by the extension developer.

Support website details (available or not): May increase the security and privacy risk score if a support website is not provided by the extension developer.

Breaches in extensions from developer: May increase the security and privacy risk score if there are any known security or privacy breaches from the developer of this extension.

Extensions from developer removed from extension store: May increase the security and privacy risk score if any of the extensions from this developer have been removed from the extension store.

Ownership for extension has changed: May increase the security and privacy risk score if the ownership of the extension has changed to a different developer.

URL reputation: For each URL referenced in the extension fetch, the GTI reputations for these unique URLs and/or domains may increase the risk score.

Use of dangerous APIs: Each unique usage of functions like the JS commands "eval( )" and "executeScript" may increase the risk score.

Third-party JS library referenced in the code: For every library referenced in the JS code, identified critical and high vulnerabilities, if any, may increase the risk score.

External JS file loaded by the extension: External JS files referenced in the code may be identified; if ATD classifies these JS files as malicious, risk score may be increased.

Other parameters that may influence the privacy and risk score include the following:

Explicit content security policy: Is there is an explicit content security policy defined?

Does the extension load scripts from specific hosts? If so, how many? Are these hosts good domains, based on GTI threat analysis? Are they ad domains, tracker domains, et cetera?

Does it use wild cards?

Does it use hypertext transfer protocol (HTTP) sites?

Does it refer to other extensions?

Does it have a published privacy policy? (May increase the security and privacy risk score if no privacy policy is published by the extension developer.)

Inference from parsing the privacy policy: May increase the security and privacy risk score if there are clauses that are unfavorable from a user's security and privacy point of view.

Analysis of permissions used by the extension: The number of critical high and medium risk permissions used may be identified. Risk score for the extension may be increased for each critical and high permission used in the extension.

For each permission, numerous APIs are available. Some of these APIs, for example, may be read-only, while others may allow modifications or updates. By way of nonlimiting example, Chrome's "chrome.bookmarks" permission exposes many APIs. A number of these are described below:

get: Retrieves the specified BookmarkTreeNode(s).

update: Updates the properties of a bookmark or folder.

create: Creates a bookmark or folder under the specified parentId.

removeTree: Recursively removes a bookmarked folder.

From the above list of APIs, get is less harmful when compared to the update, create, or remove APIs. Update could possibly modify and update a phishing URL to a user-created legitimate bookmark. Therefore, the system not only scores extensions based on the permissions it uses, but analyzes APIs used by an extension in the JS code. It then accordingly assigns a higher risk score for extensions that use APIs that can cause major harm, versus APIs that cause lesser harm.

In another aspect of the algorithm, the system may create a cluster of similar extensions using the descriptions provided by the developers. Similar extensions may be sorted based on their risk scores. The final risk score may be a sum of the risks for each of the parameters listed above. The risk scores can then be stored in a database and exposed, for example, via a representational state transfer (REST) API to endpoints.

Whenever a client or endpoint requests a reputation for an extension via the exposed REST API (e.g., via front-end service 532), the following information may be returned by way of example:

The security and privacy risk score of the extension, according to static analysis parameters.

Similar extensions from the cluster that have better or lower security and privacy risk scores (which can be used for recommendations).

The security and privacy risk scores of running the extension under different domain categories.

A client or endpoint management extension can use this information, along with the active browsing context, to decide which of the installed extensions are safe to be enabled, or if there is a need to disable any of the extensions.

The reputation store can also be used to advise the user about the associated risk when the user is about to install the extension from the extension store. It may also advise the user of similar extensions with lower risk scores, which can be suggested or recommended as replacements. Furthermore, the management extension can be used to get an overall security and privacy posture of the browser environment. It can then automatically, or with the user's consent, uninstall any extensions that have a significant negative impact on the overall security and privacy posture.

Figure 7A:
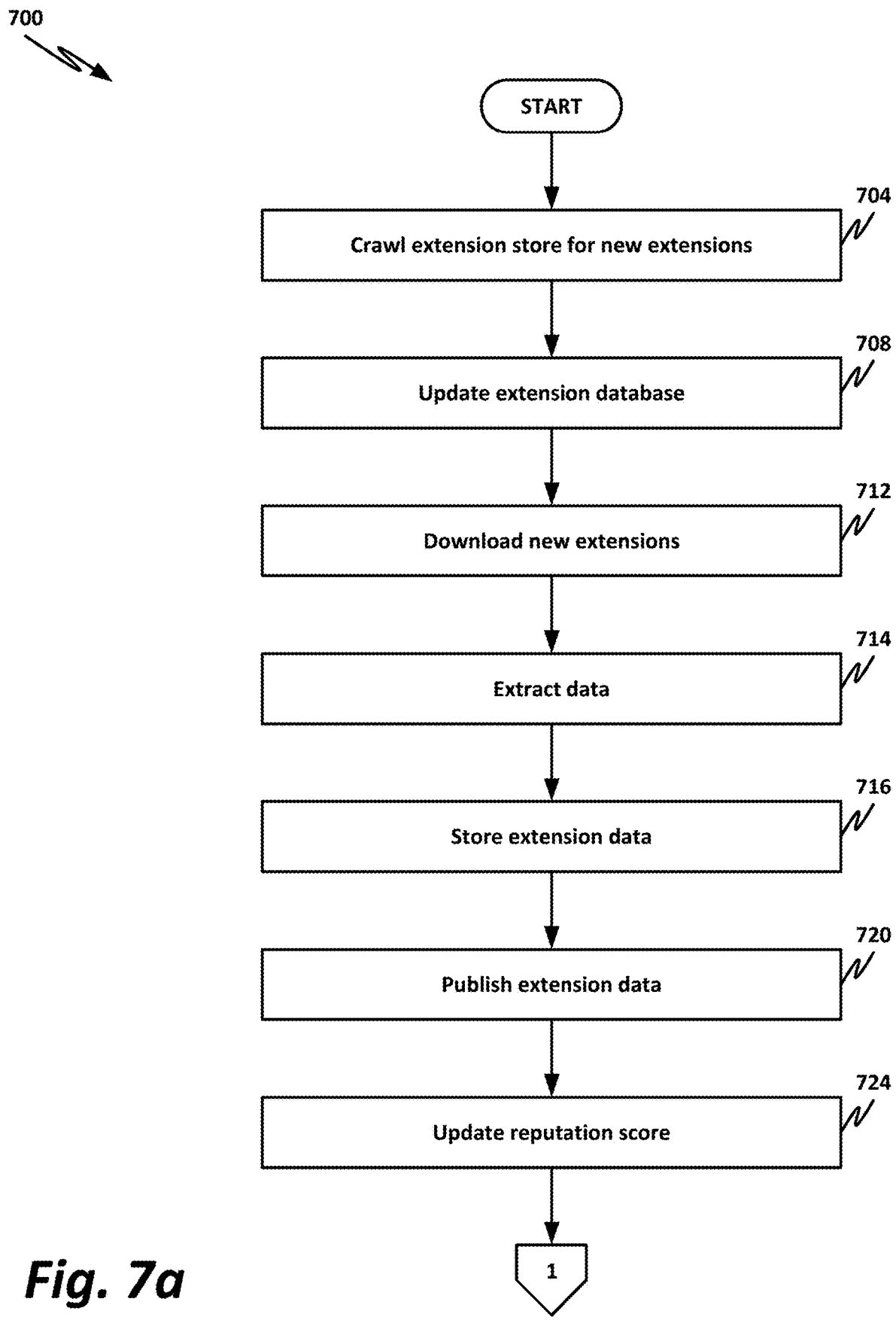
FIGS. 7a-7b are a flowchart of a method.
Figure 7B:
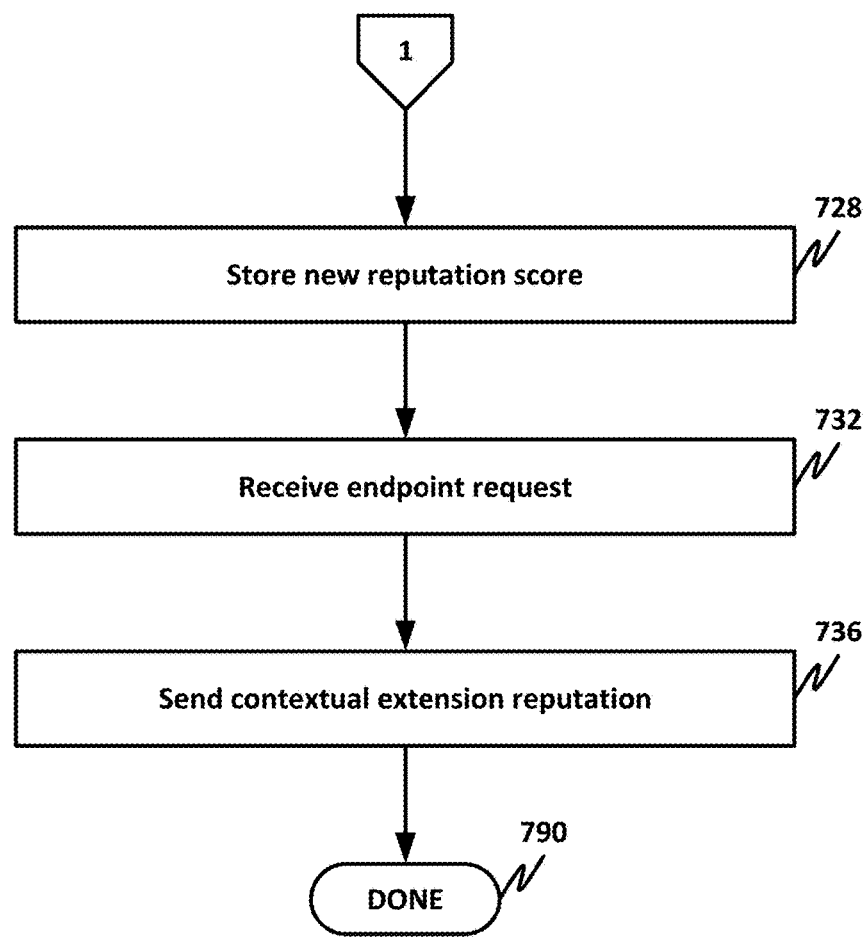

FIGS. 7a-7b are a flowchart of a method 700. Method 700 may be performed, for example, by an extension reputation cloud service running on a cloud platform. However, reputation 700 could also be performed by any other suitable module or element.

Starting in block 704, the system crawls an extension store for new available extensions. This includes extensions that have been uploaded since the last crawl. This could be performed, for example, by periodic crawler service 508 of FIG. 5, or by any other suitable module.

In block 708, the system updates the extension database. This could be provided by communication with a database service such as DB service 544 of FIG. 5, or by any other suitable module.

In block 712, the system downloads any new extensions that have been discovered. This may be performed, for example, by download service 512 of FIG. 5. The downloaded extensions may be saved in extension source repository 516.

In block 714, the system extracts data from the downloaded extensions. This could be performed, for example, by a data extraction service 536, and/or by the elements of data extraction service 600, illustrated in FIG. 6.

In block 716, the system stores extension data. This can be performed, for example, by data extraction service 536 communicating with DB service 544, to store features about the extensions in an extension reputation database 548, or in other elements.

In block 720, the system publishes extension data. For example, message service 524 may publish the extension data and make it available for other elements in the cloud service.

In block 724, the system updates the reputation score. For example, data extraction service 600 of FIG. 6 may use the various elements disclosed therein to compute a reputation score for the extension, and then publish that reputation score to the bus for each new extension.

In block 728, the system stores the reputation score. For example, database service 544 may subscribe to extension reputation scores, and may store them in extension reputation database 548.

In block 732, the system receives an endpoint reputation request. For example, front end service 532 may operate an API, and may receive from an endpoint a request for a reputation for a particular extension. Front end service 532 can then query DB service 544, either directly or via message service 524, to receive a reputation for the queried extension.

In block 736, a module such as front end service 532 may send the contextual extension reputation to the querying endpoint.

In block 790, the method is done.

Figure 8:
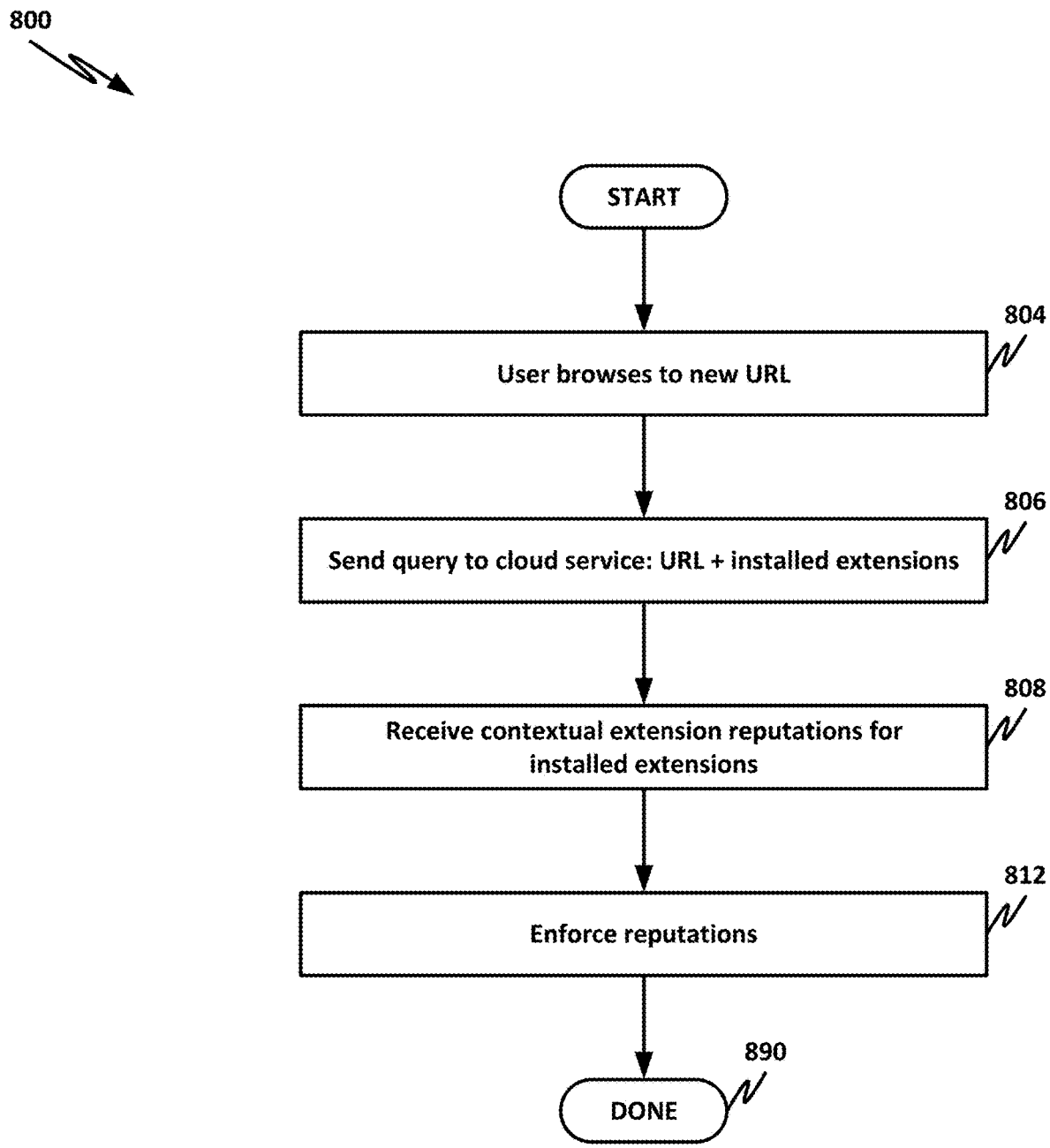
FIG. 8 is a flowchart of an additional method.

FIG. 8 is a flowchart of a method 800. Method 800 may be performed, for example, by a client device that subscribes to the reputation service.

Starting in block 804, a user of the system browses to a new URL.

In block 806, an extension manager, such as extension manager 328 of FIG. 3, intercepts the operation and determines that the URL does not have a locally cached extension. In that case, the extension manager may send a query to the cloud service. This query could include, for example, the URL plus a list of installed extensions. Note that this querying may be done periodically, so that the endpoint maintains a cache of commonly visited URLs, and a cache of reputations for extensions installed on the system. Furthermore, when the user installs a new extension, the endpoint may query the cloud service for the reputation data for that extension. As described above, these reputation data may be categorized according to URL category, so there is not always a need to query with installed extensions every time. In some cases, as in block 806, the system merely queries with the URL, and the cloud service responds with a reputation and possibly with a category for the URL, which the extension manager can then use to determine which extensions to allow or disallow for that URL.

In block 808, the extension manager receives contextual extension reputations for installed extensions. The extension manager can then determine which actions need to be taken for each URL, such as allowing, blocking, limiting, or otherwise acting on the extensions.

In block 812, the system enforces the reputations for the installed extensions in the context of their particular URLs.

In block 890, the method is done.

FIG. 9 is a block diagram of a hardware platform 900. In at least some embodiments, hardware platform 900 may be programmed, configured, or otherwise adapted to provide contextual management of browser extensions, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 900, even though they may be scattered across a data center, or even located in different data centers.

Hardware platform 900 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high-performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 900 is arranged in a point-to-point (PtP) configuration. This PtP configuration is popular for PC and server-type devices, although it is not so limited, and any other bus type may be used.

Hardware platform 900 is an example of a platform that may be used to implement embodiments of the teachings of this specification. For example, instructions could be stored in storage 950. Instructions could also be transmitted to the hardware platform in an ethereal form, such as via a network interface, or retrieved from another source via any suitable interconnect. Once received (from any source), the instructions may be loaded into memory 904, and may then be executed by one or more processor 902 to provide elements such as an operating system 906, operational agents 908, or data 912.

Hardware platform 900 may include several processors 902. For simplicity and clarity, only processors PROC0

902-1 and PROC1 902-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 902 may be any type of processor and may communicatively couple to chipset 916 via, for example, PtP interfaces. Chipset 916 may also exchange data with other elements, such as a high-performance graphics adapter 922. In alternative embodiments, any or all of the PtP links illustrated in FIG. 9 could be implemented as any type of bus, or other configuration rather than a PtP link. In various embodiments, chipset 916 may reside on the same die or package as a processor 902 or on one or more different dies or packages. Each chipset may support any suitable number of processors 902. A chipset 916 (which may be a chipset, uncore, Northbridge, Southbridge, or other suitable logic and circuitry) may also include one or more controllers to couple other components to one or more central processor units (CPUs).

Two memories, 904-1 and 904-2 are shown, connected to PROC0 902-1 and PROC1 902-2, respectively. As an example, each processor is shown connected to its memory in a direct memory access (DMA) configuration, though other memory architectures are possible, including ones in which memory 904 communicates with a processor 902 via a bus. For example, some memories may be connected via a system bus, or in a data center, memory may be accessible in a remote DMA (RDMA) configuration.

Memory 904 may include any form of volatile or non-volatile memory including, without limitation, magnetic media (e.g., one or more tape drives), optical media, flash, random access memory (RAM), double data rate RAM (DDR RAM) non-volatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 904 may be used for short, medium, and/or long-term storage. Memory 904 may store any suitable data or information utilized by platform logic. In some embodiments, memory 904 may also comprise storage for instructions that may be executed by the cores of processors 902 or other processing elements (e.g., logic resident on chipsets 916) to provide functionality.

In certain embodiments, memory 904 may comprise a relatively low-latency volatile main memory, while storage 950 may comprise a relatively higher-latency non-volatile memory. However, memory 904 and storage 950 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 904 and storage 950, for example, in a single physical memory device, and in other cases, memory 904 and/or storage 950 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 922 may be configured to provide a human-readable visual output, such as a command-line interface (CLI) or graphical desktop such as Microsoft Windows, Apple OSX desktop, or a Unix/Linux X Window System-based desktop. Graphics adapter 922 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 922 may include a hardware graphics card, which may have its own memory and its own graphics processing unit (GPU).

Chipset 916 may be in communication with a bus 928 via an interface circuit. Bus 928 may have one or more devices that communicate over it, such as a bus bridge 932, I/O devices 935, accelerators 946, communication devices 940, and a keyboard and/or mouse 938, by way of nonlimiting example. In general terms, the elements of hardware platform 900 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 940 can broadly include any communication not covered by a network interface and the various I/O devices described herein. This may include, for example, various universal serial bus (USB), FireWire, Lightning, or other serial or parallel devices that provide communications.

I/O Devices 935 may be configured to interface with any auxiliary device that connects to hardware platform 900 but that is not necessarily a part of the core architecture of hardware platform 900. A peripheral may be operable to provide extended functionality to hardware platform 900, and may or may not be wholly dependent on hardware platform 900. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 942 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 932 may be in communication with other devices such as a keyboard/mouse 938 (or other input devices such as a touch screen, trackball, etc.), communication devices 940 (such as modems, network interface devices, peripheral interfaces such as PCI or PCIe, or other types of communication devices that may communicate through a network), audio I/O 942, and/or accelerators 946. In alternative embodiments, any portions of the bus architectures could be implemented with one or more PtP links.

Operating system 906 may be, for example, Microsoft Windows, Linux, UNIX, Mac OS X, iOS, MS-DOS, or an embedded or real-time operating system (including embedded or real-time flavors of the foregoing). In some embodiments, a hardware platform 900 may function as a host platform for one or more guest systems that invoke application (e.g., operational agents 908).

Operational agents 908 may include one or more computing engines that may include one or more non-transitory computer-readable mediums having stored thereon executable instructions operable to instruct a processor to provide operational functions. At an appropriate time, such as upon booting hardware platform 900 or upon a command from operating system 906 or a user or security administrator, a processor 902 may retrieve a copy of the operational agent (or software portions thereof) from storage 950 and load it into memory 904. Processor 902 may then iteratively execute the instructions of operational agents 908 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 900 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 900 may be virtualized, in particular the processor(s) and memory. For example, a virtualized environment may run on OS 906, or OS 906 could be replaced with a hypervisor or virtual machine manager. In this configuration, a virtual machine running on hardware platform 900 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 10. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

FIG. 10 is a block illustrating selected elements of an example system-on-a-chip (SoC) 1000. In at least some embodiments, SoC 1000 may be programmed, configured, or otherwise adapted to provide contextual management of browser extensions, according to the teachings of the present specification.

At least some of the teachings of the present specification may be embodied on an SoC 1000, or may be paired with an SoC 1000. SoC 1000 may include, or may be paired with, an advanced reduced instruction set computer machine (ARM) component. For example, SoC 1000 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google *Nexus*, Microsoft Surface. SoC 1000 could also be integrated into, for example, a PC, server, video processing components, laptop computer, notebook computer, netbook, or touch-enabled device.

As with hardware platform 900 above, SoC 1000 may include multiple cores 1002-1 and 1002-2. In this illustrative example, SoC 1000 also includes an L2 cache control 1004, a GPU 1006, a video codec 1008, a liquid crystal display (LCD) I/F 1010 and an interconnect 1012. L2 cache control 1004 can include a bus interface unit 1014, a L2 cache 1016. Liquid crystal display (LCD) I/F 1010 may be associated with mobile industry processor interface (MIPI)/HDMI links that couple to an LCD.

SoC 1000 may also include a subscriber identity module (SIM) I/F 1018, a boot ROM 1020, a synchronous dynamic random access memory (SDRAM) controller 1022, a flash controller 1024, a serial peripheral interface (SPI) director 1028, a suitable power control 1030, a dynamic RAM (DRAM) 1032, and flash 1034. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 1000 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a non-volatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 11:
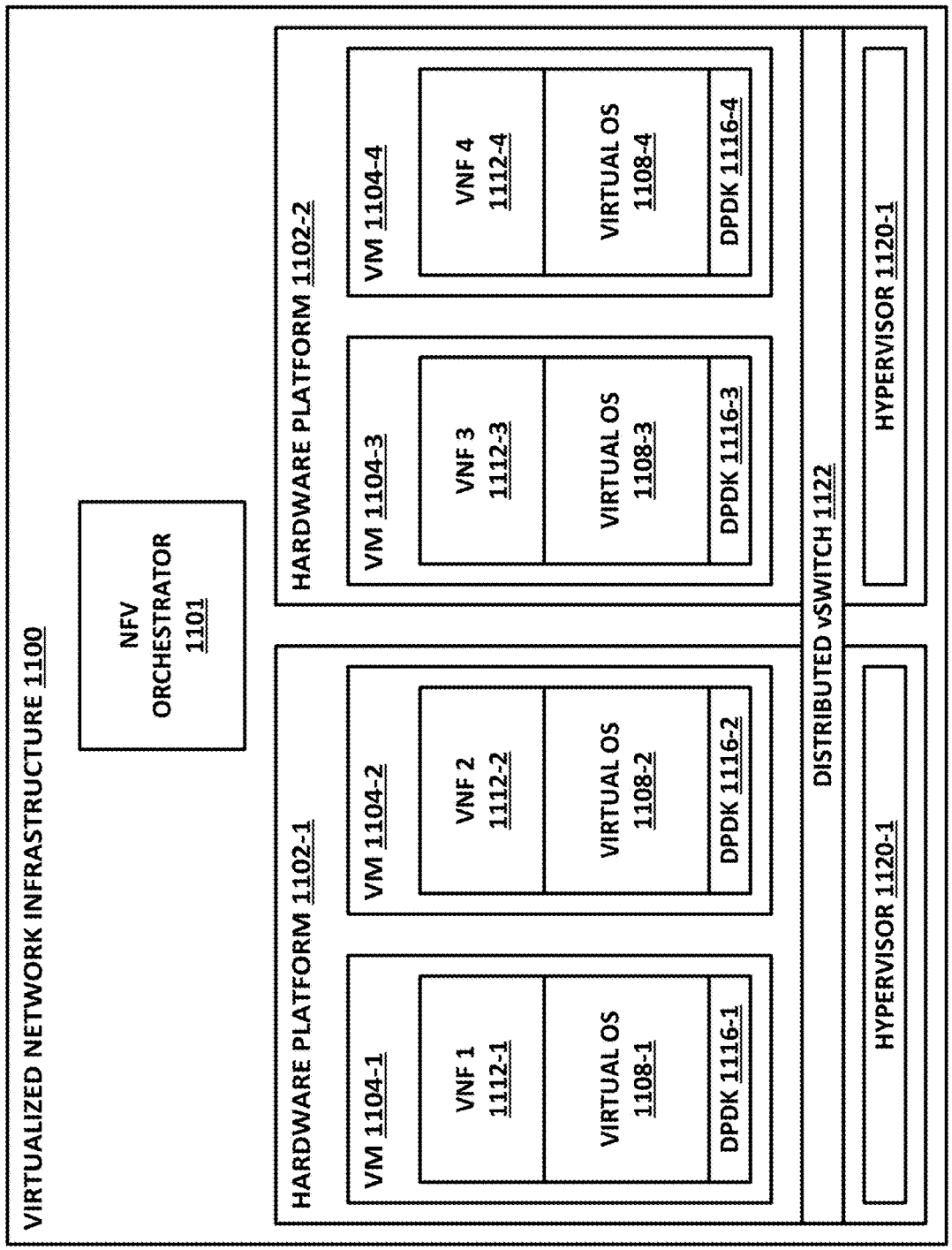
FIG. 11 is a block diagram of selected elements of a network function virtualization (NFV) infrastructure.

FIG. 11 is a block diagram of a network function virtualization (NFV) infrastructure 1100. FIG. 11 illustrates a platform for providing virtualization services. Virtualization may be used in some embodiments to provide one or more features of the present disclosure.

NFV is an aspect of network virtualization that is generally considered distinct from, but that can still interoperate with, SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun-up") or removed ("spun down") to meet network demands. For example, in times of high load, more load balancing VNFs may be spun-up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., a fabric interface). This fabric interface may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
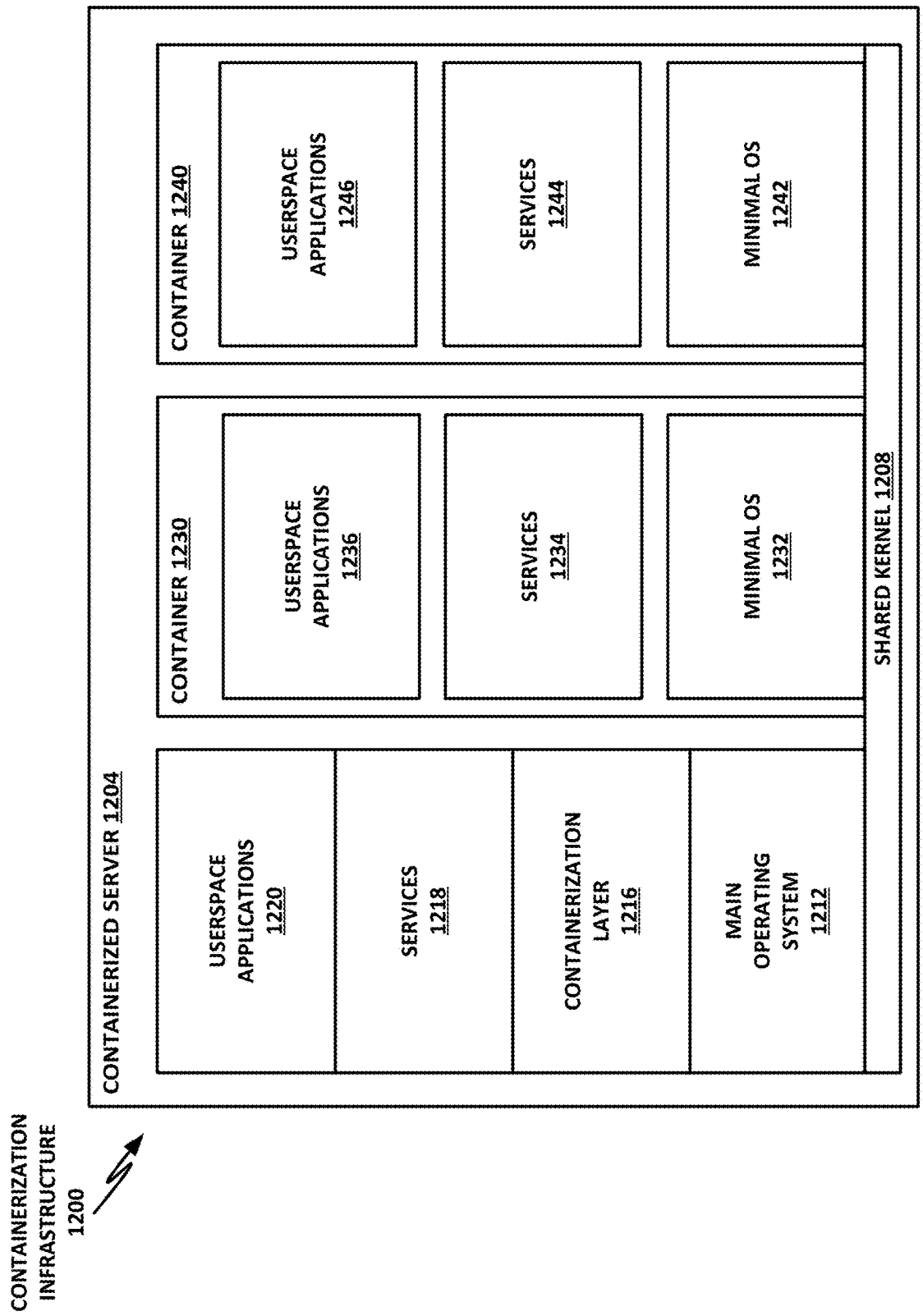
FIG. 12 is a block diagram of selected elements of a containerization infrastructure.

FIG. 12 is a block diagram of selected elements of a containerization infrastructure 1200. FIG. 12 illustrates a platform for providing containerization services. Containerization may be used in some embodiments to provide one or more features of the present disclosure. Like virtualization, containerization is a popular form of providing a guest infrastructure.

Containerization infrastructure 1200 runs on a hardware platform such as containerized server 1204. Containerized server 1204 may provide a number of processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1212 may also include a number of services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun-up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e., containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide a number of userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide a number of userspace applications 1246, as necessary.

Using containerization layer 1216, containerized server 1204 may run a number of discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 13:
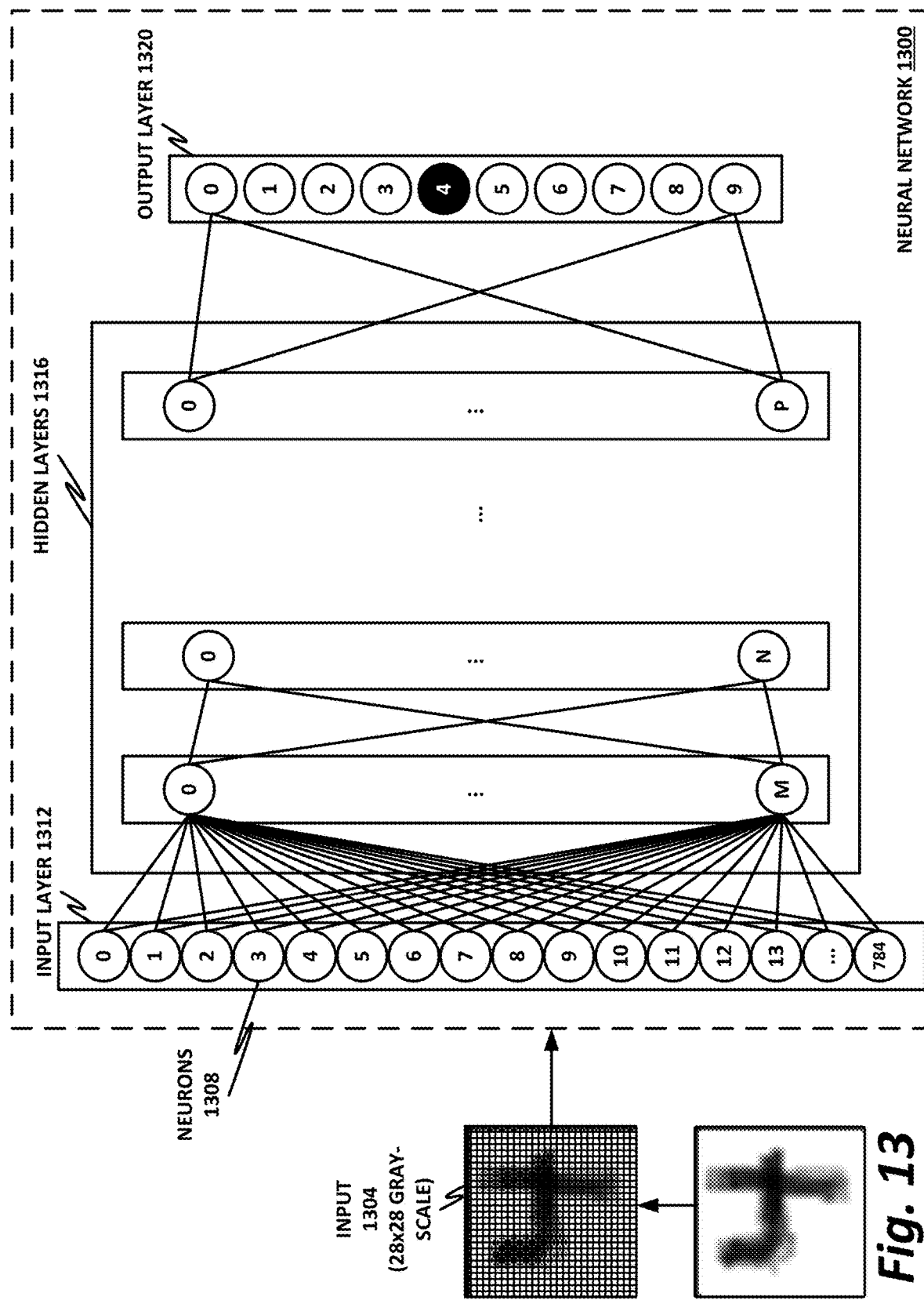
FIG. 13 illustrates machine learning according to a "textbook" problem with real-world applications.
Figure 14:
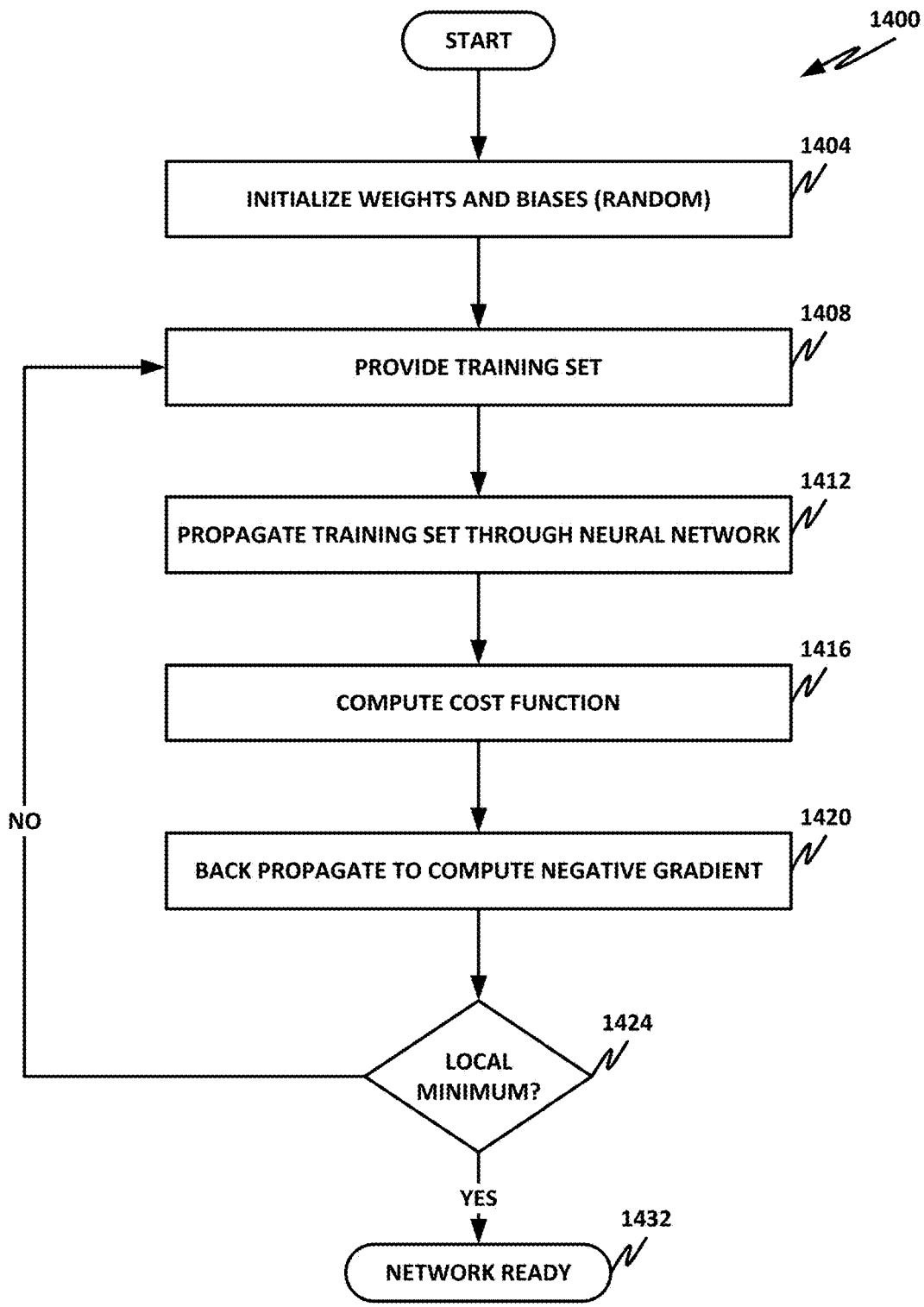
FIG. 14 is a flowchart of a method that may be used to train a neural network.
Figure 15:
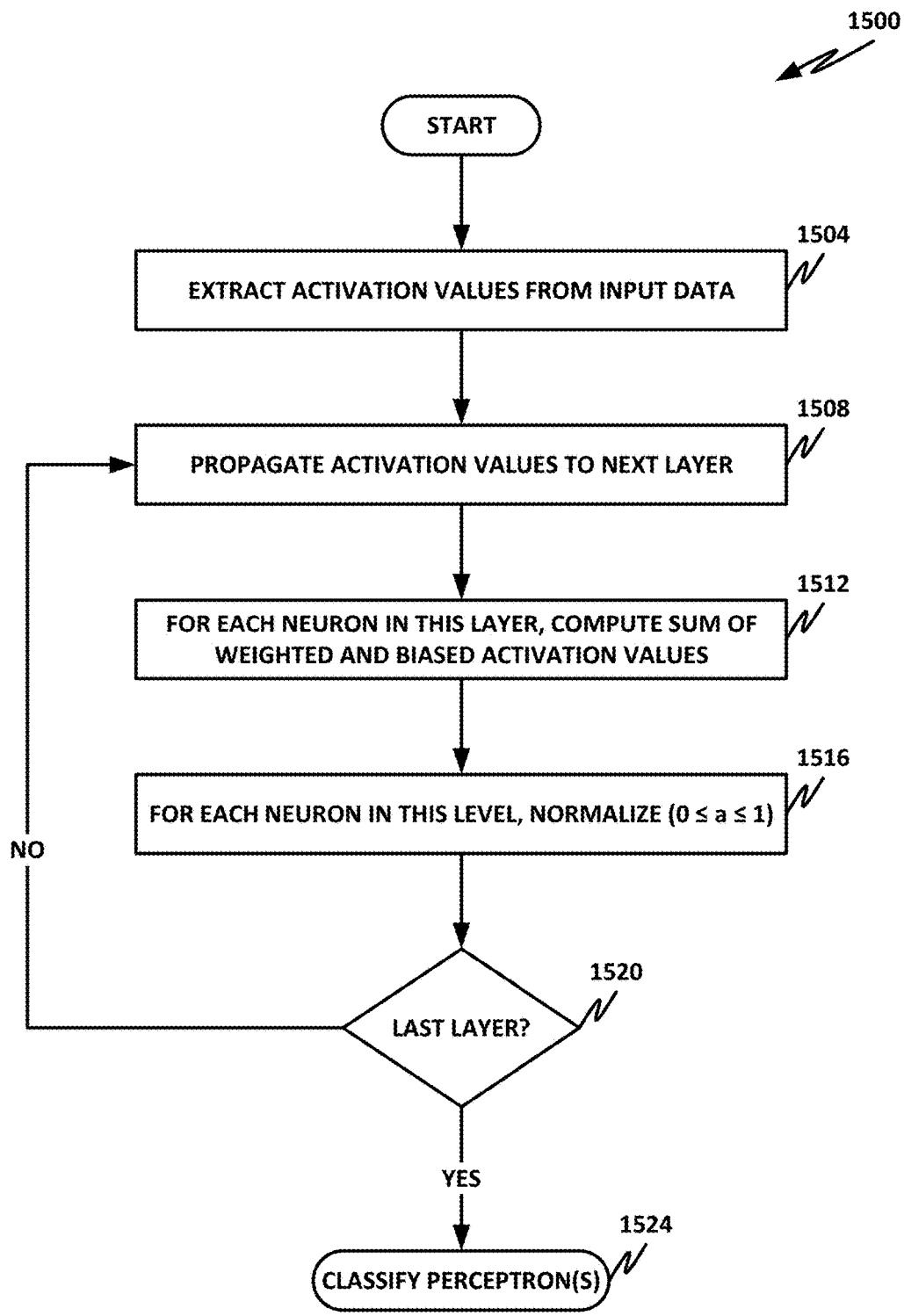
FIG. 15 is a flowchart of a method of using a neural network to classify an object.

FIGS. 13-15 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 13 illustrates machine learning according to a "textbook" problem with real-world applications. In this case, a neural network 1300 is tasked with recognizing characters.

To simplify the description, neural network 1300 is tasked only with recognizing single digits in the range of 0 through 9. These are provided as an input image 1304. In this example, input image 1304 is a 28×28-pixel 8-bit grayscale image. In other words, input image 1304 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1300 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1300 includes an input layer 1312 and an output layer 1320. In principle, input layer 1312 receives an input such as input image 1304, and at output layer 1320, neural network 1300 "lights up" a perceptron that indicates which character neural network 1300 thinks is represented by input image 1304.

Between input layer 1312 and output layer 1320 are some number of hidden layers 1316. The number of hidden layers 1316 will depend on the problem to be solved, the available compute resources, and other design factors. In general, the more hidden layers 1316, and the more neurons per hidden layer, the more accurate the neural network 1300 may become. However, adding hidden layers and neurons also increases the complexity of the neural network, and its demand on compute resources. Thus, some design skill is required to determine the appropriate number of hidden layers 1316, and how many neurons are to be represented in each hidden layer 1316.

Input layer 1312 includes, in this example, 784 "neurons" 1308. Each neuron of input layer 1312 receives information from a single pixel of input image 1304. Because input image 1304 is a 28×28 grayscale image, it has 784 pixels. Thus, each neuron in input layer 1312 holds 8 bits of information, taken from a pixel of input layer 1304. This 8-bit value is the "activation" value for that neuron.

Each neuron in input layer 1312 has a connection to each neuron in the first hidden layer in the network. In this example, the first hidden layer has neurons labeled 0 through M. Each of the M+1 neurons is connected to all 784 neurons in input layer 1312. Each neuron in hidden layer 1316 includes a kernel or transfer function, which is described in greater detail below. The kernel or transfer function determines how much "weight" to assign each connection from input layer 1312. In other words, a neuron in hidden layer 1316 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1316, until they reach the last layer, which has P+1 neurons labeled 0 through P. Each of these P+1 neurons has a connection to each neuron in output layer 1320. Output layer 1320 includes a number of neurons known as perceptrons that compute an activation value based on their weighted connections to each neuron in the last hidden layer 1316. The final activation value computed at output layer 1320 may be thought of as a "probability" that input image 1304 is the value represented by the perceptron. For example, if neural network 1300 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1316 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (σ) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma(w_0 a_0^{(0)} + w_1 a_1^{(0)} + \ldots w_{783} a_{783}^{(0)} + b)$$

In this case, it is assumed that layer 0 (input layer 1312) has 784 neurons. Where the previous layer has "n" neurons, the function can be generalized as:

$$a_0^{(1)} = \sigma(w_0 a_0^{(0)} + w_1 a_1^{(0)} + \ldots w_n a_n^{(0)} + b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} W_{0,0} & \cdots & W_{0,n} \\ \vdots & \ddots & \vdots \\ W_{(k,0)} & \cdots & W_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma(Wa^{(0)} + b)$$

Neural connections and activation values are propagated throughout the hidden layers 1316 of the network in this way, until the network reaches output layer 1320. At output layer 1320, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1320 are binomial perceptrons. Ideally, only one value is above the threshold, causing the perceptron to metaphorically "light up," and that value is selected. In the case where multiple perceptrons "light up," the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights and biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 14 is a flowchart of a method 1400. Method 1400 may be used to train a neural network, such as neural network 1300 of FIG. 13.

In block 1404, the network is initialized. Initially, neural network 1300 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1408, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1408, the initial training set is provided to the neural network. Alternatively, the full training set could be used in each iteration.

In block 1412, the training data are propagated through the neural network. Because the initial values are random, and are therefore essentially garbage, it is expected that the output will also be a garbage value. In other words, if neural network 1300 of FIG. 13 has not been trained, when input image 1304 is fed into the neural network, it is not expected with the first training set that output layer 1320 will light up perceptron 4. Rather, the perceptrons may have values that are all over the map, with no clear winner, and with very little relation to the number 4.

In block 1416, a cost function is computed as described above. For example, in neural network 1300, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1420, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1424, the system determines whether it has reached a local minimum (e.g., whether the gradient has reached 0 within the threshold). If the local minimum has not been reached, then the neural network has not been adequately trained, and control returns to block 1408 with a new training set. The training sequence continues until, in block 1424, a local minimum has been reached.

Now that a local minimum has been reached and the corrections have been back-propagated, in block 1432, the neural network is ready.

FIG. 15 is a flowchart of a method 1500. Method 1500 illustrates a method of using a neural network, such as network 1300 of FIG. 13, to classify an object.

In block 1504, the network extracts the activation values from the input data. For example, in the example of FIG. 13, each pixel in input image 1304 is assigned as an activation value to a neuron 1308 in input layer 1312.

In block 1508, the network propagates the activation values from the current layer to the next layer in the neural network. For example, after activation values have been extracted from the input image, those values may be propagated to the first hidden layer of the network.

In block 1512, for each neuron in the current layer, the neuron computes a sum of weighted and biased activation values received from each neuron in the previous layer. For example, in the illustration of FIG. 13, neuron 0 of the first hidden layer is connected to each neuron in input layer 1312. A sum of weighted values is computed from those activation values, and a bias is applied.

In block 1516, for each neuron in the current layer, the network normalizes the activation values by applying a function such as sigmoid, ReLU, or some other function.

In decision block 1520, the network determines whether it has reached the last layer in the network. If this is not the last layer, then control passes back to block 1508, where the activation values in this layer are propagated to the next layer.

Returning to decision block 1520, If the network is at the last layer, then the neurons in this layer are perceptrons that provide final output values for the object. In terminal 1524, the perceptrons are classified and used as output values.

Figure 16:
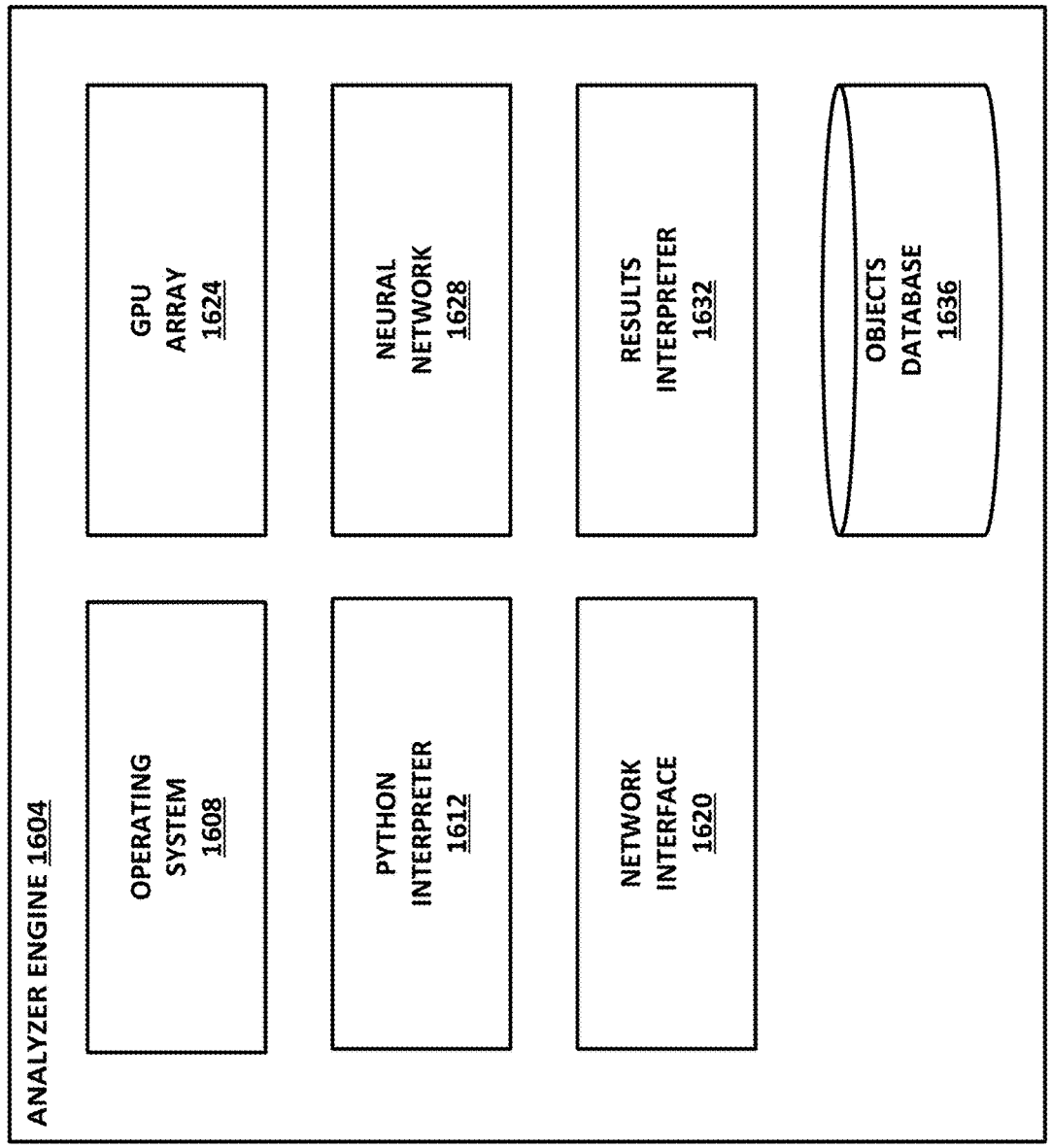
FIG. 16 is a block diagram illustrating selected elements of an analyzer engine.

FIG. 16 is a block diagram illustrating selected elements of an analyzer engine 1604. Analyzer engine 1604 may be configured to provide analysis services, such as via a neural network. FIG. 16 illustrates a platform for providing analysis services. Analysis, such as neural analysis and other machine learning models, may be used in some embodiments to provide one or more features of the present disclosure.

Note that analyzer engine 1604 is illustrated here as a single modular object, but in some cases, different aspects of analyzer engine 1604 could be provided by separate hardware, or by separate guests (e.g., virtual machines or containers) on a hardware system.

Analyzer engine 1604 includes an operating system 1608. Commonly, operating system 1608 is a Linux operating system, although other operating systems, such as Microsoft Windows, Mac OS X, or similar could be used. Analyzer engine 1604 also includes a Python interpreter 1612, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 1624 may include an array of graphics processing units that may be used to carry out the neural network functions of neural network 1628. Note that GPU arrays are a popular choice for this kind of processing, but neural networks can also be implemented in CPUs, or in ASICs or FPGAs that are specially designed to implement the neural network.

Neural network 1628 includes the actual code for carrying out the neural network, and as mentioned above, is commonly programmed in Python.

Results interpreter 1632 may include logic separate from the neural network functions that can be used to operate on the outputs of the neural network to assign the object for particular classification, perform additional analysis, and/or provide a recommended remedial action.

Objects database 1636 may include a database of known malware objects and their classifications. Neural network 1628 may initially be trained on objects within objects database 1636, and as new objects are identified, objects database 1636 may be updated with the results of additional neural network analysis.

Once final results have been obtained, the results may be sent to an appropriate destination via network interface 1620.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and an NVM. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), non-volatile RAM (NVRAM), NVM (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing endpoint, comprising:
   a hardware platform comprising a processor and a memory;
   an operating system to run on the hardware platform;
   a web browser to run on the operating system, and including an extension framework; and
   a management extension to run in the extension framework, and to contextually manage availability of other extensions, comprising receiving an extension reputation for an extension, wherein the extension reputation accounts for a uniform resource locator (URL) that a user uses with the extension, wherein the extension reputation includes an indication that the extension lacks utility for the URL, and based on the indication, blocking the extension.

2. The computing endpoint of claim 1, wherein the management extension is to periodically, or upon installation of a new extension, query a cloud reputation service for a reputation for an installed extension.

3. The computing endpoint of claim 1, wherein the management extension is to query a cloud reputation service for a URL reputation for a URL the web browser navigates to.

4. The computing endpoint of claim 3, wherein the URL reputation includes a URL category.

5. The computing endpoint of claim 4, wherein the indication includes an indication that the URL belongs to a category that lacks utility for the URL category.

6. The computing endpoint of claim 5, wherein the management extension is to disable the extension regardless of a security reputation of the extension.

7. The computing endpoint of claim 1, wherein the management extension is further to provide a graphical user interface.

8. The computing endpoint of claim 7, wherein the graphical user interface is to provide a security and privacy overview according to the other extensions.

9. The computing endpoint of claim 1, wherein the management extension further comprises a recommendation engine to identify an installed extension.

10. The computing endpoint of claim 1, wherein the extension reputation includes a categorical utility for an extension, the reputation includes a category for the URL, and the management extension is to disable the extension for the URL according to the categorical utility.

11. The computing endpoint of claim 10, wherein the management extension is to disable the extension irrespective of a security or privacy reputation of the extension.

12. One or more tangible, non-transitory computer-readable media having stored thereon executable instructions to:
provide an API connection into a web browser's extension framework;
enumerate installed extensions for the web browser;
receive from a first cloud service contextual reputation data for the installed extensions;
detect that the web browser has accessed a domain;
receive from a second cloud service a context for the domain, including an indication that an extension lacks contextual utility for the domain; and
based on the indication, disable the extension for the domain.

13. The one or more tangible, non-transitory computer-readable media of claim 12, further comprising instructions to provide a management extension, wherein the management extension is to periodically, or upon installation of a new extension, query a cloud reputation service for a reputation for an installed extension.

14. The one or more tangible, non-transitory computer-readable media of claim 12, further comprising instructions to provide a management extension, wherein the management extension is to query a cloud reputation service for a URL reputation for a URL the web browser navigates to.

15. The one or more tangible, non-transitory computer-readable media of claim 14, wherein the URL reputation includes a URL category.

16. The one or more tangible, non-transitory computer-readable media of claim 15, wherein the management extension is to contextually disable an extension that lacks utility for the URL category.

17. The one or more tangible, non-transitory computer-readable media of claim 16, wherein the management extension is to disable the extension regardless of a security reputation of the extension.

18. A method of providing contextual management of extensions to a web browser, comprising:
enumerating a plurality of installed extensions;
querying an extension reputation service for reputations for the installed extensions;
querying a URL reputation service for a reputation for a URL visited by the web browser, including a URL category;
assigning to the installed extensions contextual reputations according to their reputations and the URL category, including a reputation that an extension lacks utility for a URL category; and
selectively enabling or disabling the installed extensions according to their contextual reputations, including blocking the extension for the URL category based on the reputation that the extension lacks utility for the URL category.

19. The method of claim 18, further comprising periodically, or upon installation of a new extension, querying a cloud reputation service for a reputation for an installed extension.

20. The method of claim 18, further comprising querying a cloud reputation service for a URL reputation for a URL the web browser navigates to.

* * * * *

UNITED STATES PATENT AND TRADEMARK OFFICE
CERTIFICATE OF CORRECTION

| | | |
|---|---|---|
| PATENT NO. | : 11,836,508 B2 | Page 1 of 1 |
| APPLICATION NO. | : 17/146782 | |
| DATED | : December 5, 2023 | |
| INVENTOR(S) | : Joshi et al. | |

It is certified that error appears in the above-identified patent and that said Letters Patent is hereby corrected as shown below:

On the Title Page

Item (72), under "Inventors" in Column 1, Line 6, delete "Bengalluru" and insert -- Bengaluru --, therefor.

Signed and Sealed this
Twenty-seventh Day of February, 2024

Katherine Kelly Vidal
*Director of the United States Patent and Trademark Office*